US012658192B1

(12) United States Patent
Shakil et al.

(10) Patent No.: US 12,658,192 B1
(45) Date of Patent: Jun. 16, 2026

(54) SYSTEMS AND METHODS FOR USER-TO-USER AUTHENTICATION

(71) Applicant: The Bank of New York Mellon, New York, NY (US)

(72) Inventors: Jassem Shakil, New York, NY (US); Christian Adam, New York, NY (US); David Pollino, New York, NY (US)

(73) Assignee: The Bank of New York Mellon, New York, NY (US)

( * ) Notice: Subject to any disclaimer, the term of this patent is extended or adjusted under 35 U.S.C. 154(b) by 77 days.

(21) Appl. No.: 19/174,905

(22) Filed: Apr. 9, 2025

(51) Int. Cl.
*G10L 17/24* (2013.01)
*H04L 9/32* (2006.01)

(52) U.S. Cl.
CPC ............ *G10L 17/24* (2013.01); *H04L 9/3231* (2013.01)

(58) Field of Classification Search
CPC ... G10L 17/24; H04L 9/3231; H04L 63/0861; H04L 9/32
See application file for complete search history.

(56) References Cited

U.S. PATENT DOCUMENTS 8,463,705 B2 6/2013 Joshi et al.
9,692,758 B2 6/2017 Zeljkovic et al.

| 10,110,608 | B2 | 10/2018 | Dureau | |
| 12,248,545 | B1 * | 3/2025 | Bell | G06F 21/32 |
| 2011/0276323 | A1 * | 11/2011 | Seyfetdinov | G10L 25/78 |
| | | | | 704/E21.001 |
| 2016/0275952 | A1 * | 9/2016 | Kashtan | G10L 17/00 |
| 2018/0308501 | A1 * | 10/2018 | Johnson | G10L 17/06 |
| 2019/0327448 | A1 * | 10/2019 | Fu | G08B 3/10 |
| 2022/0036905 | A1 | 2/2022 | Keith | |
| 2022/0164801 | A1 | 5/2022 | Bruno | |
| 2025/0225520 | A1 * | 7/2025 | May | G06Q 20/40145 |

* cited by examiner

*Primary Examiner* — Huyen X Vo
(74) *Attorney, Agent, or Firm* — Foley & Lardner LLP

(57) ABSTRACT

Systems and method for user-to-user authentication for secured communications are described. For example, the system may receive, from a first user, a first user request to identify a second user, wherein the first user request indicates a first network action requiring an identify confirmation of the second user. The system may, in response to the first user request, determine a first identifier for the second user based on user information for the second user, determine a first secured token, wherein the first secured token comprises a first secured token type of a plurality of secured token types, determine a first secured token requirement for the first secured token based on the first secured token type, wherein the first secured token requirement comprises a playback characteristic of the first secured token, and compare the first secured token to the first secured token requirement.

18 Claims, 9 Drawing Sheets

150

<u>500</u>

```
┌─────────────────────────────────────────────────────────────┐
│      Receive a first user request to identify a second user  │
└─────────────────────────────────────────────────────────────┘
                                                                    502
                            │
                            ▼
┌─────────────────────────────────────────────────────────────┐
│          Determine an identifier for the second user         │
└─────────────────────────────────────────────────────────────┘
                                                                    504
                            │
                            ▼
┌─────────────────────────────────────────────────────────────┐
│                  Determine a secured token                   │
└─────────────────────────────────────────────────────────────┘
                                                                    506
                            │
                            ▼
┌─────────────────────────────────────────────────────────────┐
│            Determine a secured token requirement             │
└─────────────────────────────────────────────────────────────┘
                                                                    508
                            │
                            ▼
┌─────────────────────────────────────────────────────────────┐
│ Compare the first secured token to the first secured token requirement │
└─────────────────────────────────────────────────────────────┘
                                                                    510
                            │
                            ▼
┌─────────────────────────────────────────────────────────────┐
│              Generate a communication package                │
└─────────────────────────────────────────────────────────────┘
                                                                    512
```

FIG. 5

SYSTEMS AND METHODS FOR USER-TO-USER AUTHENTICATION

BACKGROUND

Users often need to identify others over the Internet for various reasons, such as verifying identities in online transactions, ensuring secure access to accounts, or establishing trust in communication, like in professional collaborations or social interactions. Identification is crucial in contexts like e-commerce, online banking, remote work, and social media to prevent fraud, ensure accountability, and build credibility. However, accurately identifying users is challenging because the Internet inherently lacks a physical presence, relying instead on digital footprints that can be manipulated, anonymized, or spoofed. Factors like shared devices, VPNs, proxy servers, and/or fraudulent activities complicate user identification. For example, passwords may be leaked and devices used for multi-factor authentication may be hacked.

SUMMARY

Systems and methods are described herein for novel uses and/or improvements to user-to-user authentications. As one example, systems and methods are described herein for authentications that use secured tokens that are shared between users and require a secondary form of validation from a specific user (e.g., a token that comprises a passphrase that must be verbally repeated to authenticate the user).

However, even such secondary forms of validation may face security risks as artificial intelligence (AI) may enable even playback characteristics of a user's voice to be impersonated. For example, AI may enable the creation of highly convincing fake identities or digital impersonations, such as through deepfake technologies, voice cloning, and realistic bots. These tools make it harder to distinguish between authentic users and AI-generated entities, increasing the risk of scams, identity theft, and misinformation.

To overcome these technical deficiencies, the system and methods generate secured tokens (e.g., passphrases) with specific playback characteristics-such as tone, pitch, length, and content—that are inherently difficult for AI to mimic. These passphrases may rely on dynamic, unique vocal attributes that are tied to the natural variability of a human voice of a specific user, which AI struggles to replicate perfectly in real-time. For instance, the system may require a user to repeat a phrase that is generated with varying emotional tones, pitches, verbal cues, and/or speaking speeds that highlights known characteristics of the user's voice (e.g., a user's dialect, accent, cadence, etc.) specifically to make it difficult for pre-trained AI models to anticipate or reproduce these nuances convincingly. Additionally, the system and methods may select content for the passphrases can include context-sensitive or nonsensical words that would challenge AI's natural language processing capabilities when synthesized under unpredictable conditions. The system may then generate a communication package comprising the repeated token to identify the user. By evaluating these characteristics during playback, the system may use advanced biometric analysis and/or known user characteristics to detect inconsistencies that indicate whether the audio is genuine or synthesized. This approach exploits the subtle imperfections and adaptability of human speech—qualities that AI-generated voices often lack— while dynamically varying parameters to stay ahead of adversarial attempts to replicate or bypass the system.

In some aspects, systems and method for user-to-user authentication for secured communications are described. For example, the system may receive, from a first user, a first user request to identify a second user, wherein the first user request indicates a first network action requiring an identify confirmation of the second user. The system may, in response to the first user request, determine a first identifier for the second user based on user information for the second user, determine a first secured token, wherein the first secured token comprises a first secured token type of a plurality of secured token types, determine a first secured token requirement for the first secured token based on the first secured token type, wherein the first secured token requirement comprises a playback characteristic of the first secured token, and compare the first secured token to the first secured token requirement. The system may, in response to comparing the first secured token to the first secured token requirement, generate a first communication package for transmitting to the second user based on the first identifier and the first secured token.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 5 shows a flowchart of the steps involved in user-to-user authentication for secured communications, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1A:
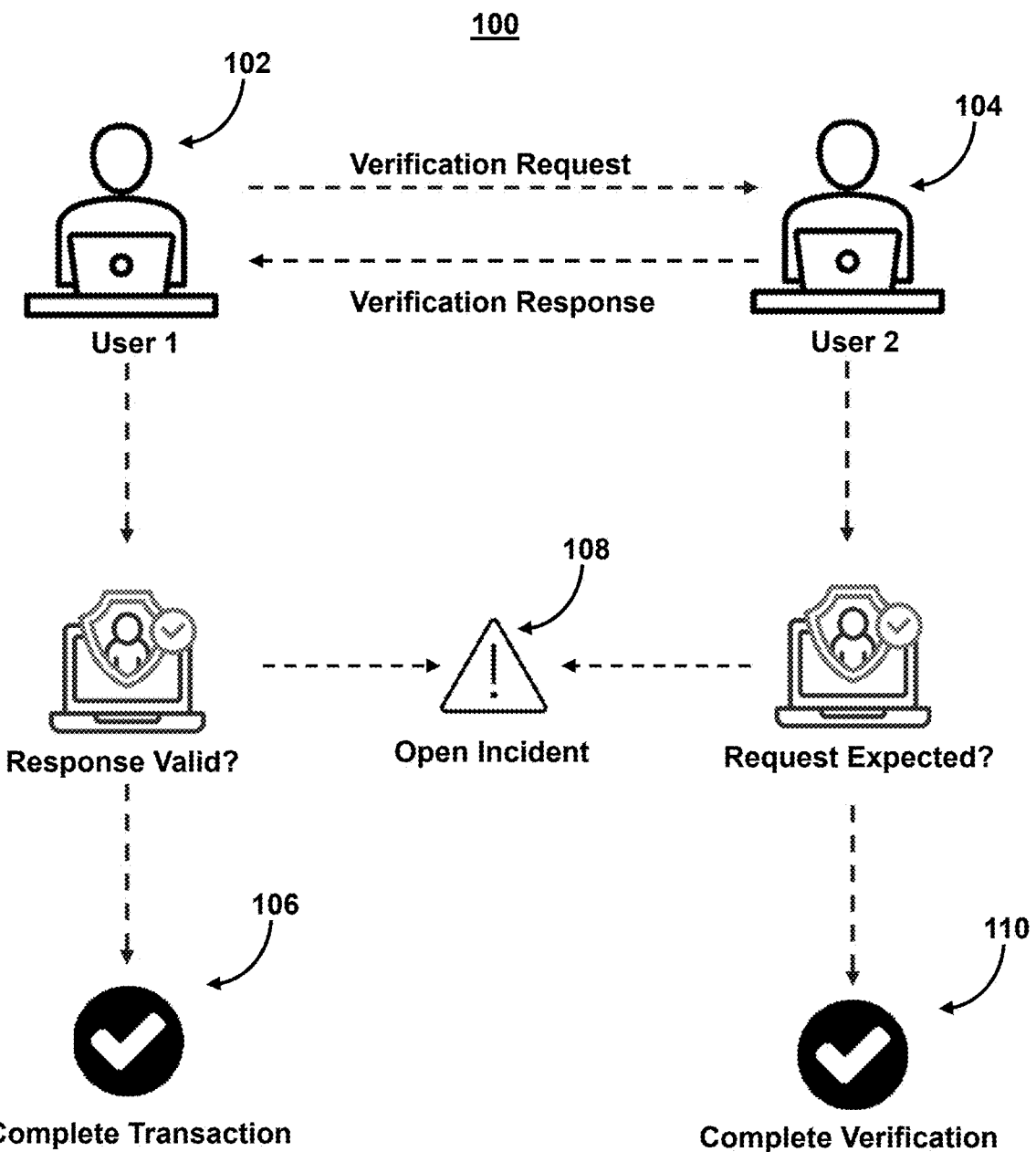
FIGS. 1A-B show illustrative diagrams for user verification, in accordance with one or more embodiments.
Figure 1B:
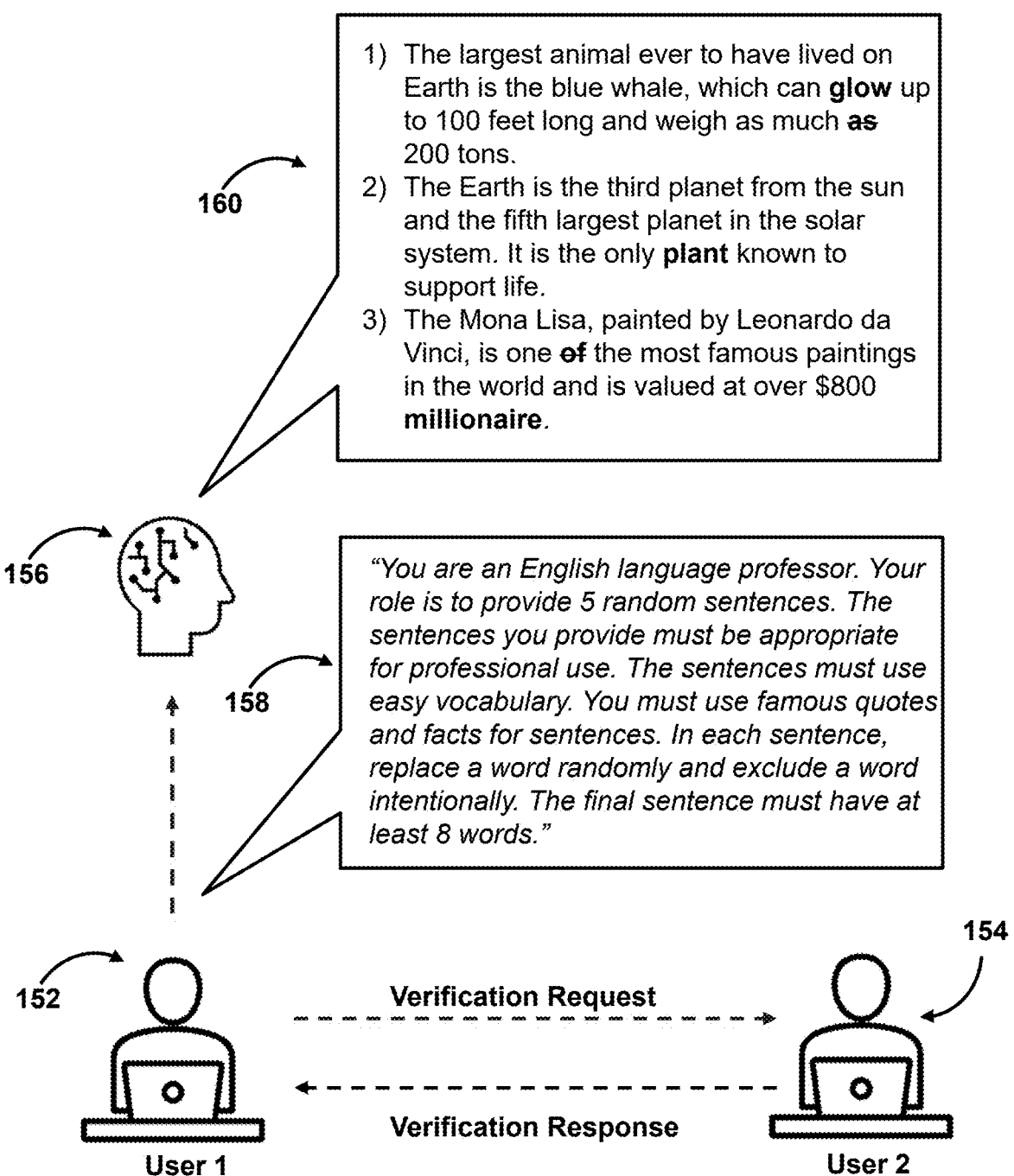

FIGS. 1A-B show illustrative diagrams for user verification, in accordance with one or more embodiments. FIG. 1A shows an illustrative diagram for user verification using a request and response cycle, in accordance with one or more embodiments. For example, FIG. 1A shows system 100. System 100 may comprise a system for a user-to-user authentication system for use in completing a network action (e.g., a transaction). To perform the authentication, system 100 may transmit secured communications between one or more user interfaces (e.g., user interface 102 and user interface 104). For example, a user-to-user authentication system, such as system 100, may be a mechanism designed to authenticate users directly with each other to complete a network action, such as a transaction. This system facilitates secure communication between user interfaces, for example, user interface 102 and user interface 104, to ensure the legitimacy of the parties involved. The authentication process typically involves the exchange of encrypted data, credentials, or tokens, which are validated to confirm the identities of the users. By enabling secure, real-time interactions, this approach minimizes reliance on third-party intermediaries, enhances security, and streamlines the completion of network actions by ensuring that only authorized users can participate in the transaction.

A user interface (UI) may be the point of interaction between a user and a system, device, or application. It encompasses the visual and interactive elements, such as buttons, menus, icons, and text fields, that allow users to communicate with and control the underlying technology. UIs can take various forms, including graphical user interfaces (GUIs) for desktops and smartphones, voice-controlled interfaces for virtual assistants, and touch-based interfaces for tablets and kiosks. Users interact with a UI to input commands, retrieve information, and perform specific tasks by navigating menus, typing inputs, clicking buttons, or using gestures like swiping and pinching. An effective user interface is intuitive, responsive, and designed to provide a seamless and efficient experience, enabling users to achieve their goals with minimal effort.

As described herein, a network action may refer to any operation or transaction conducted over a digital network, often involving the exchange of data, execution of commands, or completion of a service. In a financial services company, network actions are critical to managing and facilitating various financial processes. Examples may include conducting wire transactions, where funds are transferred securely between accounts; performing password backup checks, ensuring account security and user authentication; processing loan applications by verifying documents and communicating with underwriting systems; managing real-time stock trades; generating account statements; and handling customer support through live chat or email services. These actions rely on secure and reliable network communication to ensure accuracy, compliance, and user satisfaction, making them essential to the smooth operation of financial institutions.

Secured communication may refer to the exchange of information between two or more parties over a network in a manner that ensures the confidentiality, integrity, and authenticity of the transmitted data. This type of communication employs various security protocols and technologies, such as encryption, digital signatures, and secure authentication methods, to protect the information from unauthorized access, interception, or tampering. For example, data can be encrypted using algorithms that convert it into unreadable formats, which can only be decrypted by the intended recipient with the correct key. Secured communication is commonly used in sensitive activities like online banking, e-commerce transactions, and confidential business exchanges, where protecting information from cyber threats is critical. By implementing secure communication protocols, such as HTTPS or end-to-end encryption, parties can trust that their interactions are private, reliable, and safe from potential breaches.

User 1 (e.g., via user interface 102) may transmit a verification request to User 2 (e.g., via user interface 104). In response, User 2 may transmit a verification response. For example, based on the verification response, User 1 may validate the response, which may trigger a completion of the network action (e.g., transaction 106) or trigger an alert (e.g., incident report 108). Similarly, user 2 may confirm whether or not the verification request was expected to complete the verification process (e.g., generate verification 110).

In a user-to-user authentication process, User 1, operating through user interface 102, initiates a verification request and transmits it to User 2 via user interface 104. This request may contain information such as a unique identifier, a one-time code, or encrypted credentials to verify the intended action. Upon receiving the verification request, User 2 evaluates its legitimacy and, if deemed appropriate, transmits a verification response back to User 1. This response may include confirmation of the action, additional authentication data, or other secure information required to proceed. Based on the verification response, User 1 validates the data to ensure it matches the expected parameters. A successful validation may trigger the completion of the network action, such as a financial transaction (e.g., transaction 106), while a failure to validate may generate an alert, such as an incident report (e.g., incident report 108). Conversely, User 2 may also confirm whether the verification request was anticipated, ensuring the process aligns with their expectations, which may result in generating a verification record (e.g., verification 110). This bidirectional authentication process ensures mutual trust, security, and accuracy in completing the network action.

FIG. 1B shows an illustrative diagram for user verification using large language models, in accordance with one or more embodiments. For example, system 150 may use an LLM. A large language model (LLM) is a type of machine learning model designed to process and generate human-like text by understanding the context, structure, and semantics of language. These models, such as GPT (Generative Pretrained Transformer), are built using deep learning architectures, typically transformers, which enable them to handle large amounts of textual data and capture complex patterns and relationships within it. LLMs are trained on extensive corpora of text data from diverse sources, including books, articles, websites, and other textual content, to learn the nuances of grammar, syntax, and meaning.

Training an LLM involves two primary phases: pretraining and fine-tuning. In the pretraining phase, the model learns general language patterns by predicting missing words or sequences in the text (e.g., next-word prediction or masked language modeling). This phase typically uses unsupervised learning and massive computational resources to adjust the model's billions of parameters. In the fine-tuning phase, the model is adapted to specific tasks or domains by training it on a smaller, task-specific dataset using supervised learning or reinforcement learning techniques. This makes the model better suited for applications such as summarization, translation, or answering domain-specific questions.

Data is input into the model as text, typically formatted into tokenized sequences that the model can process. Tokenization involves breaking the input text into smaller units, such as words, subwords, or characters, which are converted into numerical representations understood by the model. Once the input is processed, the model uses its learned parameters to generate outputs, which could be responses, predictions, or classifications, depending on the application. Outputs are received as text, reconstructed from tokens into human-readable sentences or phrases. For example, when given a prompt about financial services, an LLM trained on financial datasets can generate detailed explanations, predictions, or suggestions relevant to that domain. Its ability to process vast amounts of data and generate coherent responses makes it a powerful tool for tasks such as customer support, content creation, and data analysis.

Inputting image data or other non-textual data into a LLM involves preprocessing and encoding the data into a format the LLM can interpret. Since LLMs are inherently text-based, non-textual data must first be transformed into textual or numerical representations. Advanced multimodal models, designed to handle multiple types of input such as text and images, achieve this through specialized components. For instance, image encoders like CNNs or vision transformers process image data into fixed-size numerical vectors or embeddings, which are then input to the LLM. Cross-modal embeddings further align these representations in shared latent spaces, enabling seamless interaction between modalities. Models like CLIP (Contrastive Language-Image Pre-training) align image and text embeddings, allowing them to be used interchangeably in various tasks.

For models that are not inherently multimodal, non-textual data can be converted into text-like structures. For example, images can be described using image captioning models to generate textual captions, while audio data can be transcribed into text using speech-to-text algorithms. Tabular or numeric data can be structured into formats like CSV or JSON, and feature embeddings extracted from non-textual data using pretrained encoders can be directly incorporated as input.

In multimodal models, separate encoders are often used for different data types, such as image or audio encoders, which are then combined with the LLM in a shared architecture. These models undergo multimodal pretraining on datasets pairing textual and non-textual data, such as image-caption pairs. Examples include ChatGPT with vision capabilities, which uses a vision encoder to preprocess images and integrate them into the language processing pipeline, and CLIP, which aligns text and image embeddings in a shared space.

In should be noted that various algorithms and training techniques may be used to train models and/or serve applications as described herein, depending on the type of data, the problem being solved, and the architecture of the model. Example algorithms include gradient descent and its variants, such as stochastic gradient descent (SGD), which iteratively updates model parameters to minimize a loss function. Advanced versions may optimize this process by adjusting the learning rate dynamically. For classification problems, models often rely on algorithms like logistic regression, decision trees, random forests, or support vector machines (SVM). For deep learning, architectures like CNNs are used for image-related tasks, while recurrent neural networks (RNNs) and transformers are preferred for sequence-based tasks, such as natural language processing.

Training techniques vary to improve efficiency and performance. Supervised learning uses labeled data, where the model learns by comparing predictions to known outcomes, while unsupervised learning identifies hidden patterns in unlabeled data. Semi-supervised learning combines both approaches, leveraging a smaller set of labeled data with a larger set of unlabeled data. Reinforcement learning allows models to learn through trial and error by interacting with an environment and receiving feedback in the form of rewards or penalties.

Other techniques include transfer learning, where a pre-trained model is fine-tuned on new data to save training time and resources, and ensemble learning, which combines predictions from multiple models to improve accuracy. Data augmentation, such as flipping or rotating images, and regularization methods, like dropout, are used to enhance generalization and prevent overfitting. These algorithms and techniques collectively enable the training of robust and efficient models tailored to diverse applications, from image recognition to financial forecasting.

As shown in FIG. 1B, system 150 may generate a first secured session between a first user (e.g., user 152) and a second user (e.g., user 154). During, or prior to, the first secured session, the system may prompt LLM 156 to generate a secured token for a first communication package for identifying the second user. For example, system 150 may describe an authentication workflow in which a user (e.g., user 152) initiates a verification process by prompting LLM 156 to randomly generate sentences that another user (e.g., user 154) must accurately repeat to complete their authentication. This process leverages the LLM's ability to generate unpredictable yet structured responses, making it difficult for unauthorized users or automated bots to predict or bypass the authentication challenge.

Additionally or alternatively, the authentication workflow may integrate a chat-based medium where interactions between users and the LLM serve as a means of verification. The LLM can analyze conversation patterns, detect anomalies, and identify potential fraudulent activity by assessing linguistic behavior, response coherence, and behavioral consistency. If suspicious activity is detected—such as irregular response timing, inconsistent language patterns, or indications of automated response generation—the system may flag the session for further review or deny authentication.

For example, user 152 may submit a prompt to LLM 158. System 150 enables user 152 to submit a prompt to LLM 158 by leveraging an API-driven mechanism that facilitates dynamic sentence generation for authentication purposes. When user 152 initiates the authentication workflow, the application communicates with LLM 158 via an API call, requesting the generation of a list of random sentences designed to serve as authentication challenges. The prompt submitted to LLM 158 includes specific instructions to introduce entropy into the generated sentences, ensuring that each output is unique, unpredictable, and resistant to pattern-based attacks. This added entropy may involve randomized linguistic structures, varied vocabulary, syntactic modifications, or contextual shifts that make it difficult for automated systems or unauthorized users to anticipate or replicate the generated sentences. Once the sentences are retrieved, they are presented to the verifying user (e.g., user 154), who must accurately reproduce them as part of the authentication process.

For example, prompt 158 may state "You are an English language professor. Your role is to provide 5 random sentences. The sentences you provide must be appropriate for professional use. The sentences must use easy vocabulary. You must use famous quotes and facts for sentences. In each sentence, replace a word randomly and exclude a word intentionally. The final sentence must have at least 8 words."

In response to prompt 158, the system may generate secured token 160, which includes malformed sentences. System 150 may then await a user submission of a second secured token in response to the prompt. For example, the purpose of creating malformed sentences in response 160 is to leverage Natural Language Processing (NLP) to detect fraudulent activity by analyzing how a user processes and repeats textual information. Humans, due to cognitive biases and neural processing shortcuts, often make mistakes when repeating sentences that contain subtle linguistic anomalies. This occurs because frequently occurring patterns in language are "short-circuited" in the human brain, leading to a superficial understanding where deep comprehension pathways are bypassed in favor of rapid information gathering. As a result, a human user may unknowingly correct errors, omit inconsistencies, or misinterpret structurally malformed sentences while repeating them. In contrast, an automated system or fraudulent entity utilizing AI-based bots likely repeat the malformed sentence exactly as presented, as machines lack the cognitive shortcuts and heuristic-driven processing that characterize human reading and comprehension. By analyzing these discrepancies using NLP techniques, system 150 can distinguish between legitimate human users and potential fraudsters. This approach enhances security by detecting unnatural patterns in sentence reproduction, thereby preventing automated attacks or unauthorized access attempts that rely on AI-driven fraud techniques.

System 150 detects the absence of fraud when a user incorrectly repeats malformed sentences in a manner that aligns with typical human cognitive biases. When encountering sentences with subtle errors, a human user is likely to unconsciously correct mistakes, omit anomalies, or restructure phrases due to the brain's natural tendency to prioritize meaning over exact replication. This phenomenon results from cognitive shortcuts, where frequently encountered language patterns are processed at a higher level, leading to automatic corrections without conscious effort. In contrast, an AI bot, lacking these cognitive biases, would faithfully reproduce the malformed sentence exactly as presented. By leveraging Natural Language Processing (NLP), system 150 analyzes the discrepancies between the original malformed sentence and the user's response, identifying patterns consistent with human error. If the mistakes made reflect the expected tendencies of a human reader—such as misreading transposed words, ignoring subtle grammatical errors, or inserting missing context—the system determines that the response is authentic. This distinction allows system 150 to verify legitimate users while effectively filtering out automated fraud attempts that rely on precise, pattern-based replication.

Figure 2A:
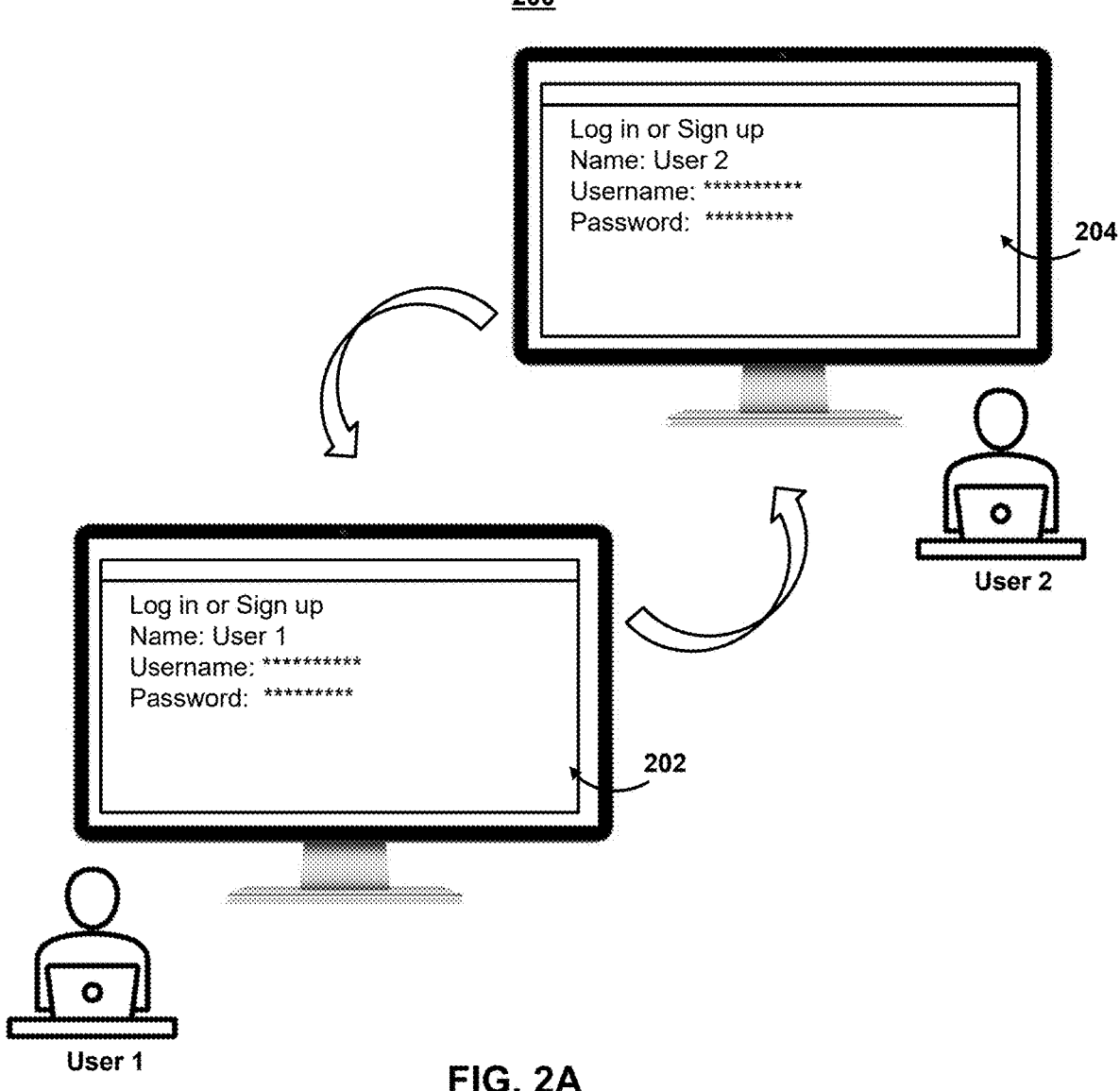
FIGS. 2A-D show illustrative diagrams for user-to-user authentication for secured communications, in accordance with one or more embodiments.

FIGS. 2A-D shows illustrative diagrams for user-to-user authentication for secured communications, in accordance with one or more embodiments. FIGS. 2A-D illustrate system 200 via various user interfaces. FIG. 2A may shows user interface 202 and user interface 204. User 1 may use user interface 202 to sign in to establish a secured session. Similarly, User 2 may use user interface 204 to sign in to establish the secured session. For example, the system may receive user credentials and/or match these credentials to known user profiles and/or accounts. User 1 uses user interface 202 to sign in and establish a secured session by entering their authentication credentials, such as a username and password, biometric data (e.g., fingerprint or facial recognition), or a one-time passcode generated by an authentication app. The system receives these credentials and processes them to verify User 1's and/or User 2's identity.

This may involve matching the provided credentials against known user profiles or accounts stored securely in the system's database. If the credentials match a valid profile, the system establishes a secured session, often by encrypting the communication channel to protect sensitive data exchanged during the session. This process ensures that only authorized users can access the system, enabling User 1 and/or User 2 to interact with the platform securely and perform network actions or other tasks within a protected environment.

Figure 2B:
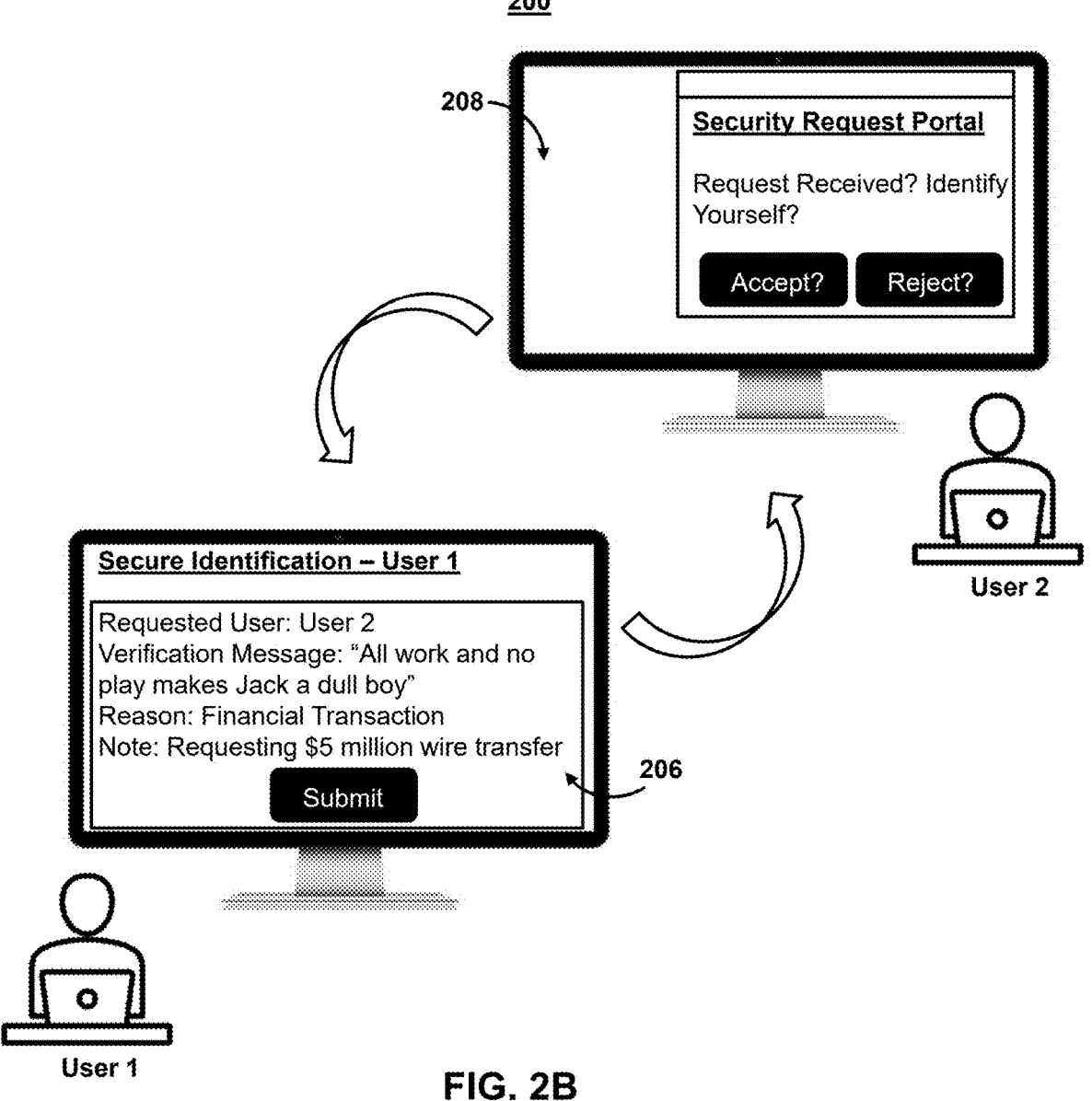

FIG. 2B may shows user interface 206 and user interface 208. User 1 may use user interface 206 to request a verification and/or authentication. Similarly, User 2 may use user interface 208 to accept the requested verification. User 1 may enter details about User 2 and/or the requested network action needing authentication. For example, User 1 may enter a requested user (e.g., a user identifier such as a name and/or account), a requested network action (e.g., a transaction), characteristics about the network action (e.g., a time, date, amount, etc.), a token (e.g., a passphrase).

For example, system 200 sets up verification and/or authentication by facilitating a structured exchange of information between users to confirm the legitimacy of a network action. User 1, through user interface 206, initiates the process by requesting a verification and/or authentication. This request typically includes details about User 2, such as a user identifier (e.g., name, account number, or email address), and information about the network action requiring authentication, such as the type of action (e.g., a transaction), specific characteristics (e.g., time, date, amount, or location), and any associated security tokens (e.g., a one-time passphrase or encrypted code). The system records these details and generates a verification request, which is securely transmitted to User 2 via user interface 208.

User 2 then reviews the request to ensure it aligns with their expectations and accepts or rejects it. Acceptance may involve confirming the details provided by User 1 or entering additional authentication information, such as a secondary token or biometric verification. Once User 2 responds, the system evaluates the response against the original request. If the verification matches the required criteria, the system authenticates the action, allowing it to proceed. Otherwise, the system may deny the request or trigger an alert to investigate potential discrepancies. This multi-step process ensures robust security and transparency for both parties involved in the network action.

Figure 2C:
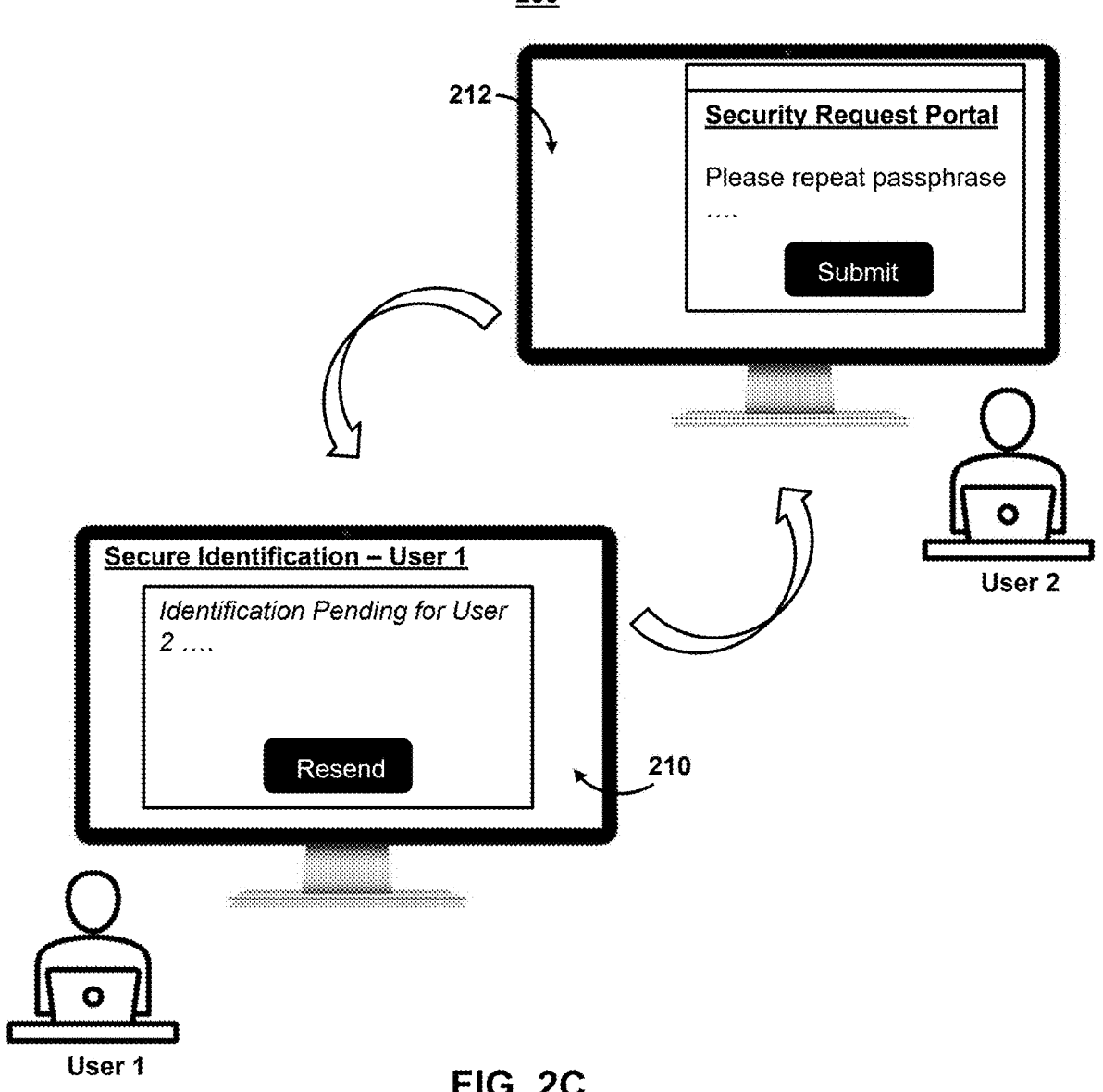

FIG. 2C may shows user interface 210 and user interface 212. User 1 may use user interface 210 to monitor a verification and/or authentication that is pending. Similarly, User 2 may use user interface 212 to submit a token (e.g., verbally repeat a passphrase). For example, system 200 may receive a user submission of a secured token by facilitating the input and validation process through designated user interfaces. For instance, User 1, using user interface 210, can monitor the status of a pending verification or authentication request. This interface may display real-time updates, such as whether the request has been acknowledged or if additional action is required. Meanwhile, User 2, using user interface 212, can respond to the verification request by submitting the required secured token. The token could take various forms, such as a typed passcode, a scanned QR code, or even a verbally repeated passphrase captured by the system.

When User 2 submits the token, the system validates it by comparing it against the expected value associated with the original verification request. If the token matches, the system authenticates the action and may notify User 1 that the verification is complete. If the token is incorrect or fails verification, the system can prompt User 2 to resubmit or flag the attempt for further review. This secure and structured approach ensures that only authorized users can complete the network action while providing transparency and accountability throughout the process.

Figure 2D:
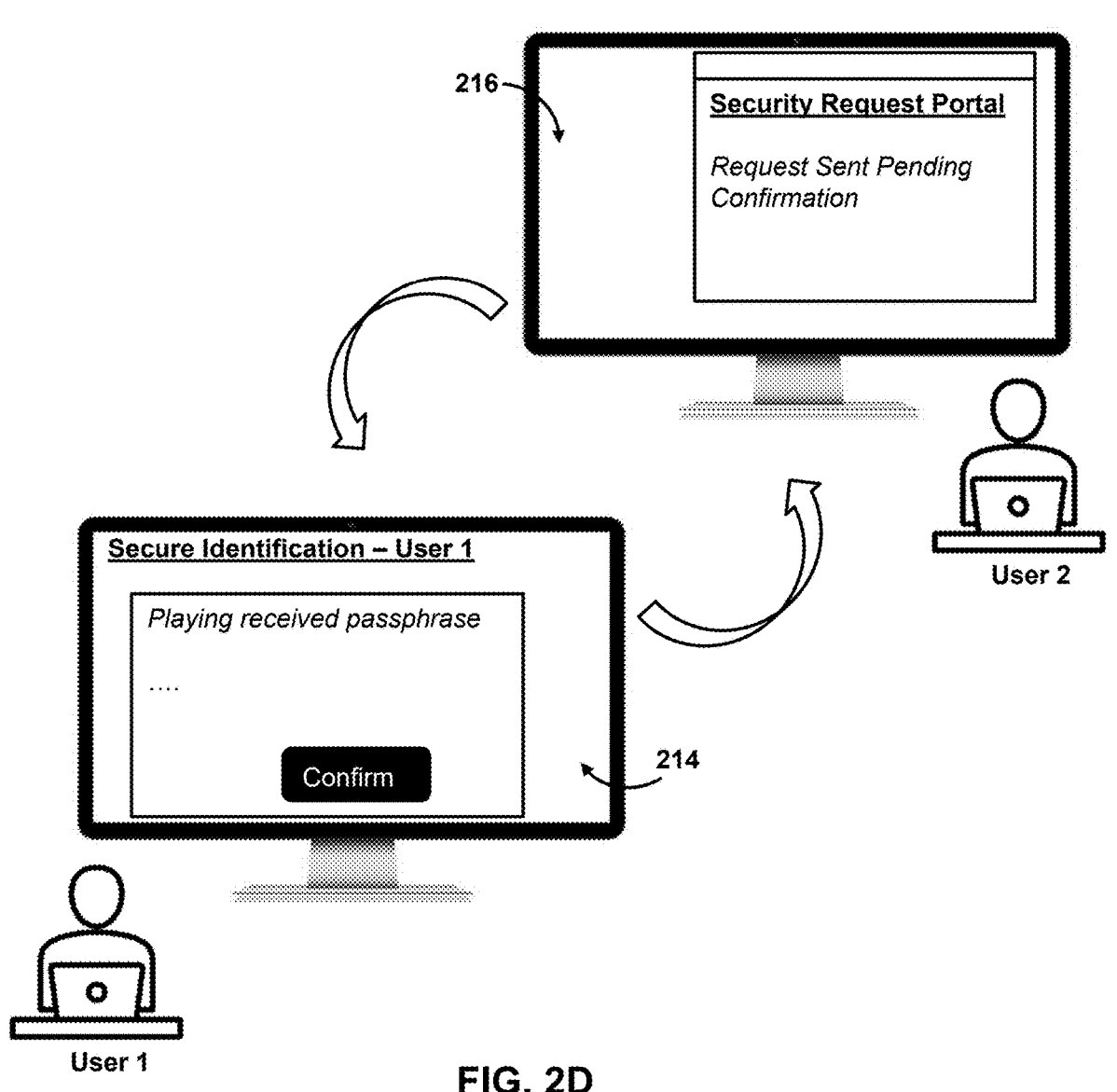

FIG. 2D may shows user interface 214 and user interface 216. System 200 shows User 1 verifying the received token (e.g., listening to a playback of the verbal passphrase submitted by User 2) via user interface 214. Similarly, User 2 may use user interface 216 to monitor the pending verification. For example, system 200 enables User 1 to verify the received token through user interface 214, providing tools for reviewing and validating the information submitted by User 2. For example, if User 2 submits a verbal passphrase as the secured token, the system records the audio and makes it accessible to User 1 via playback functionality on user interface 214. User 1 can listen to the playback, compare it to the expected passphrase, and confirm whether it matches the original request. The interface may also include options to mark the token as valid, reject it if discrepancies are detected, or request a new submission if necessary.

Simultaneously, User 2 can use user interface 216 to monitor the status of the verification process. This interface may display updates indicating whether the token has been received, is under review, or has been approved or rejected. User 2 can also receive prompts or notifications if additional action is required, such as resubmitting the token or clarifying details. This two-way interaction ensures both users remain informed and engaged throughout the verification process, enhancing transparency and reducing the risk of errors or miscommunication.

Figure 3:
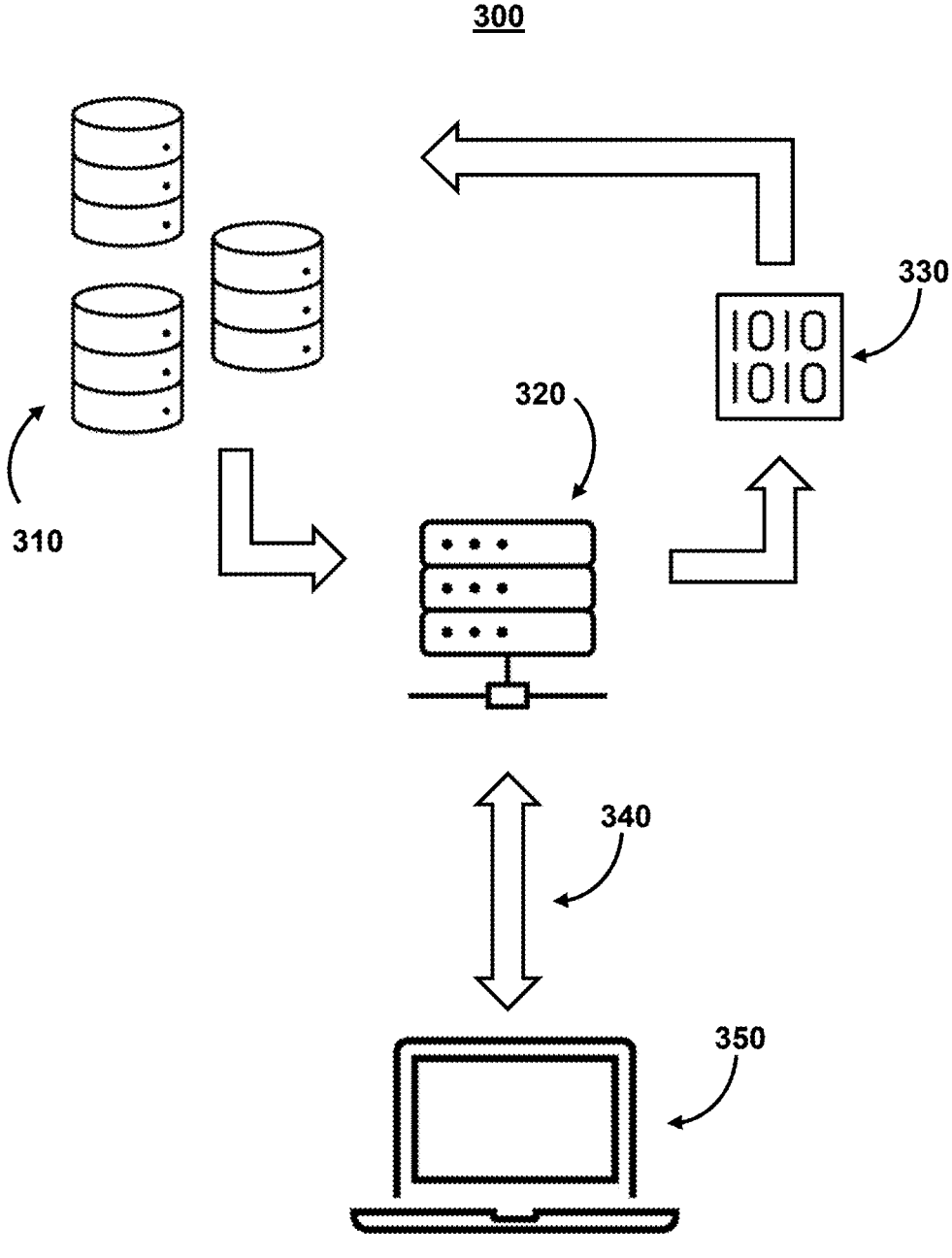
FIG. 3 shows illustrative components for a system used for user authentication, in accordance with one or more embodiments.

FIG. 3 shows illustrative components for a system used for user authentication, in accordance with one or more embodiments. For example, FIG. 3 may show illustrative components for user-to-user authentication for cryptographically secured communications across encrypted computer networks. As shown in FIG. 3, system 300 may include device 310. Device 310 (as well as the other devices and components described herein) may comprise electronic storage. Electronic storage devices are systems designed to electronically store information in various formats and media. These devices may utilize non-transitory storage and/or computer-readable media to retain data and can include both system storage, which is integrally provided within servers or client devices (e.g., substantially non-removable storage), and removable storage that can be connected to servers or client devices through interfaces such as USB ports, FireWire ports, or disk drives. Electronic storage media encompass a wide range of technologies, including optically readable storage media like optical disks, magnetically readable storage media such as magnetic tapes, hard drives, and floppy disks, as well as electrical charge-based storage media like EEPROM and RAM. Solid-state storage media, such as flash drives, are another common type of electronic storage. Additionally, virtual storage resources, including cloud storage, virtual private networks (VPNs), and other virtualized systems, are considered part of electronic storage. These devices are capable of storing various forms of data, including software algorithms, information processed or determined by processors, data obtained from servers or client devices, and other essential information that supports the functionality of various processes.

In some embodiments, system 300 and/or one or more components herein may be implemented using an application specific integrated circuit. An integrated circuit may be a small electronic device made of semiconductor material, typically silicon, that contains a large number of microscopic electronic components such as transistors, resistors, capacitors, and diodes. These components are interconnected to perform a specific function or set of functions. Integrated circuits can be classified into various types based on their functionality, such as analog, digital, and mixed-signal ICs. The transistors within an IC are the primary building blocks, as they act as switches or amplifiers for electronic signals. The other components, like resistors and capacitors, are used for controlling voltage, current, and timing within the circuit. System 300 may design the integrated circuit to be application specific such that design of the circuit is customized for a given application. In some embodiments, system 300 may use an integrated circuit system where one or more integrated circuit are spread throughout a system, network, and/or one or more devices. In such case, the system design may ensure that the circuits are integrated with other electronic components like connectors, power supplies, and sensors to form a complete and functional electronic system. This integration allows for the implementation of sophisticated tasks in devices needed for one or more specified applications.

System 300 may send and/or receive data to device 320, which may generate output 330. System 300 may facilitate the transfer of data between device 310 and device 320, enabling the generation of output 330. Device 310, which functions as a storage device, holds the data that is sent to device 320, such as a CPU. A CPU, or Central Processing Unit, is the primary component of a computer responsible for executing instructions and performing computations necessary for various processes and functions. The CPU may interpret and execute instructions from programs and operating systems through a cycle of fetching, decoding, and executing commands. This cycle begins with the CPU retrieving an instruction from the system's memory, followed by decoding it to understand the required operation, and finally executing it by performing arithmetic, logical, control, or input/output tasks. The CPU relies on its internal components, including the arithmetic logic unit (ALU) for mathematical operations, the control unit (CU) for directing data flow, and registers for temporary data storage. By leveraging its clock speed and multiple cores in modern processors, the CPU can execute complex processes efficiently, enabling the functionality of applications and systems.

Device 320 processes the received data by implementing one or more applications and/or models to perform specific tasks or computations. These applications or models analyze, transform, or process the input data to produce the desired output 330. This output may represent the results of calculations, simulations, or other operations conducted by the applications or models on device 320. The system ensures seamless communication between the devices, allowing for efficient data transfer and output generation.

Output 330 may represent the result of processing data or executing instructions. In the case of a CPU, outputs can include processed data, computational results, or responses to input commands. For models, outputs often consist of predictions, classifications, decisions, or other data derived from the model's algorithms or trained parameters. Once generated, the output is typically stored in a suitable storage medium, such as system memory (RAM), a local storage device (e.g., hard drive or SSD), or a networked storage system. This stored output can then be used in various ways depending on the application. For example, it might be displayed to users as visual or textual information, serve as input for subsequent computational tasks, or be transmitted to other devices or systems for further processing. The efficient storage and utilization of outputs are essential for enabling real-time responsiveness, supporting iterative processes, and ensuring seamless integration with larger workflows or systems.

System 300 may also include terminal 350. Terminal 350 may include a user interface that may be used to interact with one or more components in system 300. As referred to herein, a "user interface" may comprise a human-computer interaction and communication in a device, and may include display screens, keyboards, a mouse, and the appearance of a desktop. For example, a user interface may comprise a way a user interacts with an application or a website. As referred to herein, "content" should be understood to mean an electronically consumable user asset, such as Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user generated content may include content created and/or consumed by a user. For example, user generated content may include content created by another, but consumed and/or published by the user.

Users may interact with a system through various types of terminals in system 300 (although only a single terminal is shown for simplicity), which serve as access points for communication and control. Terminals can include traditional devices such as desktop computers, laptops, and workstations, which often feature input peripherals like keyboards and mice and output peripherals like monitors. Mobile devices, such as smartphones and tablets, provide touchscreens and voice recognition as primary interaction methods, offering portability and convenience. Specialized terminals, such as kiosks, point-of-sale (POS) systems, or industrial control panels, are designed for specific applications, often with simplified interfaces like touchscreens or dedicated buttons. Wearable devices, including smartwatches and augmented reality (AR) glasses, offer hands-free interaction via gestures, voice commands, or sensors. Users may also engage with systems through virtual assistants, using voice-based interactions, or through command-line interfaces for text-based commands. Other interaction methods include haptic feedback, biometric inputs (e.g., fingerprint or facial recognition), and adaptive technologies like eye-tracking for users with disabilities. These diverse terminals and interaction methods enable systems to cater to various use cases, environments, and user preferences.

An I/O (Input/Output) path refers to the communication pathway that facilitates the exchange of data between computing devices or systems. I/O path 340, for instance, may encompass a variety of communication networks such as the Internet, mobile phone networks, mobile voice or data networks like 5G or LTE, cable networks, public switched telephone networks (PSTN), or combinations of these. These networks provide the infrastructure for transmitting data across different mediums. The I/O path can also include specific communication paths, such as satellite links, fiber-optic connections, cable connections, Internet-based communication paths (e.g., IPTV), and free-space links that support wireless or broadcast signals. In addition to external communication networks, computing devices may feature internal communication paths that integrate hardware, software, and firmware components. For example, multiple computing devices can operate as part of a unified cloud-based platform, leveraging interconnected communication paths to function collectively. These I/O paths are essential for ensuring seamless data flow, supporting applications, and enabling distributed computing environments.

In some embodiments, system 300 may be a cloud system. A system structured as a cloud system is designed to provide scalable, on-demand access to computing resources and services over the Internet or other networks. In a cloud system, multiple interconnected servers, data centers, and storage devices work together to deliver virtualized computing power, storage, and applications. These resources are hosted remotely in distributed locations, creating a virtualized environment that can dynamically allocate resources based on user demands. The cloud system is typically organized into three main service models: Infrastructure as a Service (IaaS), which offers virtualized hardware and network resources; Platform as a Service (PaaS), which provides tools and frameworks for application development; and Software as a Service (SaaS), which delivers software applications to users. The system relies on communication paths, including high-speed fiber-optic networks, satellite links, and wireless connections, to enable seamless interaction between users and the cloud infrastructure. Advanced management tools and load-balancing mechanisms ensure reliability, efficiency, and fault tolerance within the system. This structure allows users to access computing resources flexibly and cost-effectively without the need to maintain physical hardware.

In some embodiments, system 300 may use one or more APIs. An API, or Application Programming Interface, is a set of rules and protocols that allows different components within a system, such as system 300, to communicate and interact seamlessly. APIs define how software applications, services, or devices can request and exchange data, enabling interoperability between components regardless of their underlying technologies. Within a system, an API acts as a bridge between different modules, such as databases, user interfaces, or external services, facilitating the flow of information and the execution of commands.

For instance, in system 300, an API might enable device 310, a data storage component, to provide information to device 320, a processing unit. Device 320 could use the API to request specific data, execute operations, or send processed results back to another component. The API specifies the format and structure of the requests and responses, such as using JSON or XML, and enforces security protocols like authentication tokens or encryption to ensure secure communication.

APIs can also enable external systems to interact with system 300. For example, a financial application could use an API to query account balances, initiate transactions, or retrieve fraud detection reports generated by a model housed within the system. By standardizing interactions, APIs simplify the integration of diverse components, improve scalability, and support modular system designs, making it easier to expand or update individual parts without disrupting the entire system.

Figure 4:
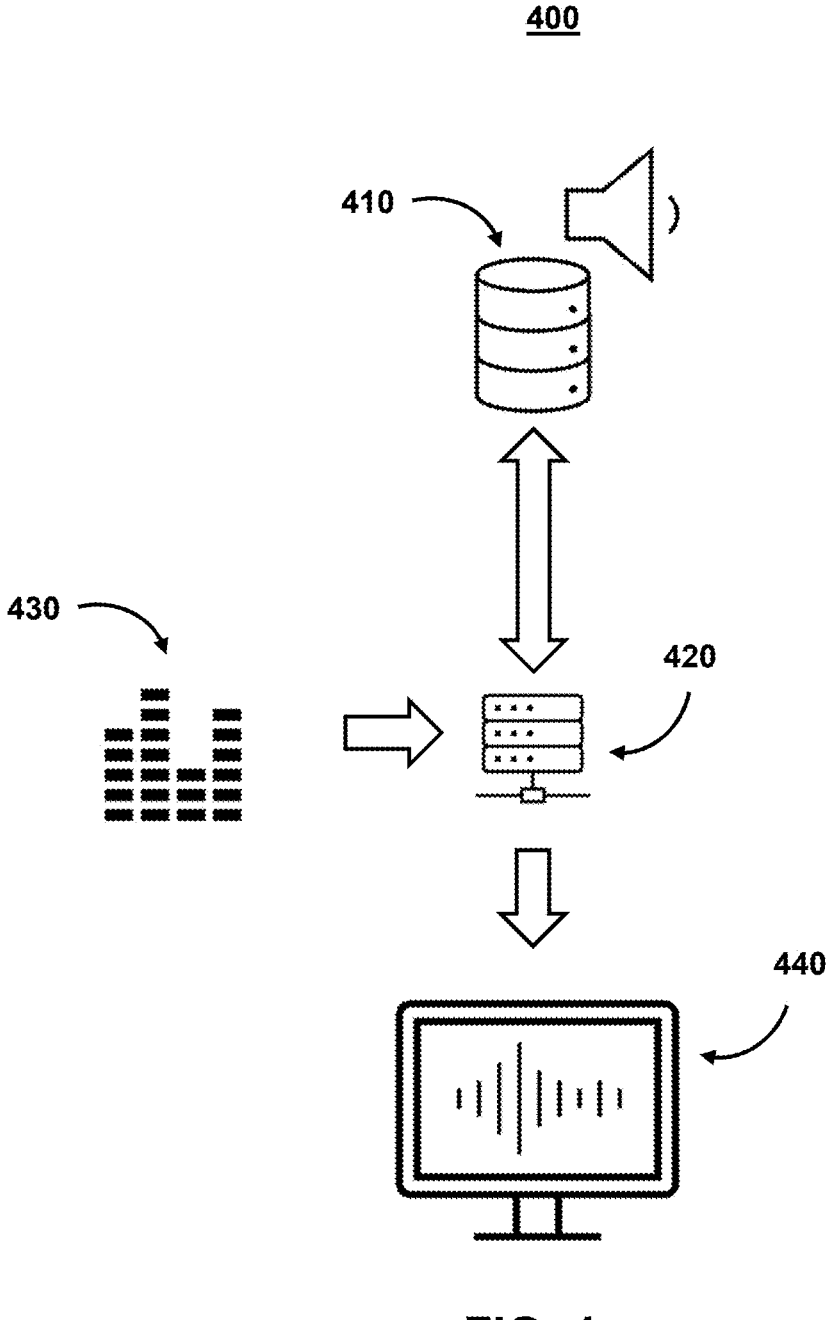
FIG. 4 shows illustrative components for a system using a model for user authentication, in accordance with one or more embodiments.

FIG. 4 shows illustrative components for a system using a model for user authentication, in accordance with one or more embodiments. For example, FIG. 4 may show illustrative components for user-to-user authentication for cryptographically secured communications across encrypted computer networks. System 400 may comprise one or more artificial intelligence and/or machine learning models. Artificial intelligence (AI) and machine learning (ML) models are computational systems designed to perform tasks that typically require human intelligence, such as recognizing patterns, making predictions, and learning from data. AI models encompass a broad range of techniques, including rule-based systems, natural language processing, and deep learning, to simulate intelligent behavior. Machine learning, a subset of AI, focuses on developing algorithms that allow models to learn and improve their performance from data without being explicitly programmed. ML models are trained on large datasets to identify patterns and relationships, enabling them to make predictions, classify information, or automate decision-making processes. These models can be supervised, where they learn from labeled data; unsupervised, where they identify patterns in unlabeled data; or reinforced, where they learn through trial and error using feedback. Examples of a model may include neural networks for image recognition, decision trees for predictive analytics, and transformers for language understanding. AI and ML models are used in various fields, such as healthcare, finance, transportation, and entertainment, to drive innovation and enhance efficiency.

It should be noted that system 400 may also include non-AI models. Non-AI models are computational or mathematical models that do not rely on artificial intelligence or machine learning techniques. Instead, they use predefined rules, equations, or algorithms to simulate processes, analyze data, or solve problems based on established principles. Examples of non-AI models include statistical models, such as linear regression and logistic regression, which are used to identify relationships between variables and make predictions; deterministic models (e.g., Newtonian mechanics or circuit analysis); and rule-based systems, where a set of predefined rules governs decision-making or problem-solving.

Non-AI models may be implemented by programming the underlying rules, equations, or algorithms directly into software or hardware. For instance, statistical models are implemented using mathematical libraries or statistical software, while rule-based systems are often coded into decision-support applications. Deterministic models can be built using simulation software or computational frameworks that apply known physical laws. These models require precise inputs and often operate in scenarios where variability is minimal or well-understood. While non-AI models lack the adaptability and learning capabilities of AI models, they are often faster, more transparent, and easier to validate, making them suitable for well-defined problems with consistent parameters.

In some embodiments, system 400 may comprise a model that requires training. A model that requires training is a machine learning (ML) or artificial intelligence (AI) model that learns patterns, relationships, or rules from a dataset to make predictions, classify information, or perform specific tasks. Training such a model involves exposing it to a labeled dataset—referred to as training data—that includes input features and corresponding outputs or labels. The model uses this data to iteratively adjust its parameters to minimize errors and improve its accuracy in predicting outputs for new, unseen inputs. Training mechanisms often rely on optimization algorithms, such as gradient descent, to update the model's weights based on a loss function, which measures the difference between predicted and actual outcomes.

Training data (e.g., training data 410) may serve as the foundation for the model's learning. It typically consists of structured examples where each instance includes input variables (e.g., images, numerical data, or text) and desired outputs. For example, in financial services, a model designed for check cashing based on images might use training data comprising scanned check images labeled with information such as amounts, payees, or account details. During training, the model learns to recognize patterns, such as handwriting styles or printed text, and correlates them with the appropriate output.

Training data 410 may be collected from various sources. For example, the system may collect training data by gathering and organizing relevant information from various sources to build a dataset that represents the problem the model is designed to solve. This process often begins with identifying the specific objectives of the model and determining the types of data required to achieve those goals. Training data can be collected from structured databases, such as financial transaction records or customer profiles, or unstructured sources, like images, videos, text documents, or audio files. In cases where labeled data is needed, annotations or labels are added manually by human experts or automatically using tools like optical character recognition (OCR) or natural language processing (NLP) systems.

For example, in the context of check cashing, training data may include a large set of check images collected from banks, financial institutions, or customer uploads, along with corresponding metadata such as account numbers, payee details, and check amounts. Systems may also integrate data from online repositories, APIs, or real-time inputs from user interactions. Additionally, data preprocessing techniques, such as cleaning, normalization, and augmentation, are applied to ensure the quality, consistency, and diversity of the dataset. Ethical considerations and data privacy may be important during data collection to ensure compliance with regulations and protect user information. Once collected, the training data is stored in a format that facilitates efficient access and processing during the model training phase, enabling the system to learn patterns and improve its performance.

Mechanisms used for training include supervised learning, where labeled data guides the model; unsupervised learning, where the model identifies patterns in unlabeled data; and reinforcement learning, where the model learns by receiving feedback in the form of rewards or penalties. In the case of check cashing, supervised learning would be employed, as labeled images of checks provide clear examples for the model to learn from. Techniques like convolutional neural networks (CNNs) are particularly effective for analyzing image data, enabling the model to extract features like text, logos, or signatures from checks. Once trained, the model can automate tasks such as fraud detection, data extraction, or account verification in financial services, improving efficiency and accuracy.

Using training data 410, system 400 may train a model housed at device 420. For example, system 400 trains a model housed at device 420 by using training data 410 as the foundational input to guide the learning process. The system begins by feeding the training data, which consists of input-output pairs or labeled examples, into the model located on device 420. The model processes these inputs and generates predictions or outputs. A loss function, designed to measure the difference between the model's predictions and the actual outputs in the training data, evaluates the accuracy of these predictions. Device 420 uses optimization algorithms, such as gradient descent, to adjust the model's parameters (e.g., weights and biases) in a way that minimizes this loss.

In some embodiments, the system houses training data, such as training data 410, comprising verbal authentications of a given passphrase by securely storing and organizing audio samples in a structured database or repository. Each entry in the training dataset typically includes recordings of users verbalizing specific passphrases, along with associated metadata such as the speaker's identity, recording date, environmental conditions, and any additional characteristics relevant to the authentication process. The data is collected in diverse scenarios to account for variations in accents, speech patterns, and background noise, ensuring robust performance of the authentication system under real-world conditions.

To maintain security and privacy, the system encrypts the training data and restricts access to authorized personnel or algorithms designed for training and evaluation purposes. The data may also be anonymized or processed to remove personally identifiable information (PII) while retaining the essential features needed for analysis. This dataset can be used to train machine learning models or voice recognition algorithms, enabling the system to accurately match incoming verbal authentications against the expected passphrase. By continuously updating and refining the training data, the system can adapt to evolving user needs and enhance the reliability of verbal authentication processes.

The training process may be iterative, meaning the system repeatedly passes the training data through the model, updates the parameters, and recalculates the loss until the model achieves a desirable level of accuracy or the loss reaches an acceptable threshold. Techniques such as batching (processing subsets of the data at a time) and epoch cycling (repeating the full dataset through the model multiple times) are often used to improve efficiency and learning. During training, device 420 may leverage computational accelerators like GPUs or TPUs to handle the intensive computations required for large-scale datasets or complex models.

For instance, if system 400 is training an image recognition model for check cashing, the training data 410 might include labeled check images paired with corresponding metadata such as account numbers or check amounts. The model at device 420 learns to extract relevant features, such as text, logos, or handwriting styles, from the images. Over time, the adjustments made during training enable the model to accurately process new, unseen data for tasks like fraud detection or automated data entry.

In another example, if system 400 is training a voice recognition model for verification, the training data 410 might include labeled voice cues paired with users and/or passphrases. The model at device 420 learns to extract relevant features, such the number of pitch variations, timbre characteristics, phonetic characteristics, acoustic characteristics, and/or audio waveform patterns for passphrases generated by an AI model. Over time, the adjustments made during training enable the model to accurately process new, unseen data for tasks like fraud detection or to detect whether a user submission is generated by an AI model.

For example, the system processes new, unseen data for tasks like fraud detection or identifying whether a user submission is generated by an AI model by leveraging a trained model designed to recognize specific patterns and anomalies. For instance, if system 400 is training a voice recognition model for verification, it uses labeled training data 410 that pairs voice cues with corresponding users and passphrases. This training data enables the model at device 420 to learn how to extract relevant features from the audio inputs. These features might include pitch variations, timbre characteristics, phonetic structures, acoustic signatures, and waveform patterns. Additionally, the system can be trained to differentiate human-generated passphrases from those synthesized by AI models by identifying subtle inconsistencies or unnatural patterns often present in AI-generated audio.

During the training phase, the model iteratively adjusts its internal parameters to minimize errors in predictions, improving its ability to generalize from known data to new, unseen inputs. Once trained, the model processes incoming data by extracting and analyzing the same features it learned from the training phase. For fraud detection, it identifies anomalies such as mismatched user profiles, unusual audio characteristics, or deviations from expected patterns, flagging them for further review. For detecting AI-generated submissions, it analyzes characteristics unique to synthesized audio, such as lack of natural variability or artifacts from the generation process. Over time, as more data is processed and the model is fine-tuned, its accuracy and reliability improve, making it a powerful tool for securing authentication systems and detecting fraudulent or AI-generated inputs.

A model housed on device 420, trained using training data 410, receives input 430 and processes it to generate output 440 through a sequence of computational steps. When input 430 is provided, it is first preprocessed, if necessary, to ensure compatibility with the model's architecture. Preprocessing may include normalization, resizing (for images), tokenization (for text), or encoding data into a structured format. Once the input is prepared, it is passed into the trained model on device 420.

The model processes the input using its learned parameters, which were optimized during the training phase using training data 410. The input flows through the model's layers, where features are extracted, transformed, and combined at various stages to derive meaningful representations. For example, in a deep learning model, convolutional layers might identify patterns like edges or shapes in images, while fully connected layers aggregate these patterns to make predictions or classifications. The final output, represented as output 440, is generated in the form of predictions, classifications, or extracted information, depending on the model's purpose.

A system uses a model to detect fraud or other problems in the financial services industry by analyzing data patterns, behaviors, and transactions to identify anomalies or indicators of fraudulent activities. The model, trained on historical data, learns to differentiate between normal and potentially fraudulent activities based on features like transaction amounts, frequency, locations, or user behavior. When the system receives new data, it processes the input through the model, which evaluates the data using the patterns it has learned. If the input deviates significantly from normal behavior or matches patterns associated with known fraud, the model flags it as suspicious. For example, in wire fraud detection, a machine learning model might analyze transaction data in real time to assess factors such as the amount spent, the transfer locations, and the user's transaction history. If the model detects an unusually large wire made in a foreign country shortly after another transaction in the user's home country, it could classify the transaction as potentially fraudulent. Similarly, for check processing, the system might use image recognition models to identify signs of tampering or mismatches between the written and printed information.

Once flagged, the system can trigger automated alerts, block the transaction, or escalate the case for human review. Advanced systems may also use feedback loops to improve over time, updating the model with newly confirmed cases of fraud to enhance detection accuracy. By leveraging models to monitor and analyze large volumes of data, financial systems can efficiently identify and mitigate fraud, minimize losses, and protect users.

As described above, the model housed on device 420 may determine whether a textual phrase is suitable for generation by training on a large dataset of textual examples labeled as either appropriate or inappropriate for the intended context. During training, the model learns to identify patterns, linguistic features, and contextual cues that indicate whether a phrase aligns with predefined guidelines to prevent such a phrase from being mimicked by generative artificial intelligence and/or a potential unauthorized party, such as relevance, coherence, factual accuracy, ethical standards, or conversational appropriateness. As described, this process typically involves supervised learning, where the dataset includes human-annotated labels, and the model uses these labels to minimize errors in classification over successive iterations. In addition to linguistic features, the model may also incorporate metadata, such as context, tone, or user intent, to better assess the suitability of a phrase. Techniques like reinforcement learning with human feedback (RLHF) may also be used to refine the model further, where human evaluators provide feedback on model outputs to help it learn nuanced preferences and avoid generating harmful or nonsensical content. The ultimate goal is for the model to generalize these learned criteria to new, unseen phrases and reliably assess their appropriateness during generation of output 440.

FIG. 5 shows a flowchart of the steps involved in user-to-user authentication for secured communications, in accordance with one or more embodiments. For example, the system may use process 500 (e.g., as implemented on one or more system components described above) in order to provide user-to-user authentication for cryptographically secured communications across encrypted computer networks.

At step 502, process 500 (e.g., using one or more components described above) receives a first user request to identify a second user. For example, the system may receive, from a first user, a first user request to identify a second user, wherein the first user request indicates a first network action requiring an identify confirmation of the second user. For example, the system may receive a request from a first user to identify a second user by facilitating the input and transmission of the required details through a secure interface. The first user submits the request using their designated user interface, providing information about the second user and specifying the network action that necessitates identity confirmation. The request may include identifiers for the second user, such as their name, account number, or contact details, and details of the network action, such as its type (e.g., a financial transaction or data access), purpose, and any associated parameters like time, date, or amount. The system processes the incoming request by recording and validating the provided information, ensuring that it aligns with predefined security protocols. It then initiates the identity confirmation process by either reaching out to the second user or cross-referencing the submitted data with existing records or authentication systems. This ensures that the second user's identity is accurately verified before proceeding with the requested network action. By securely managing these interactions, the system ensures that only authorized users can complete sensitive actions, reducing the risk of fraud or errors.

At step 504, process 500 (e.g., using one or more components described above) determines an identifier for the second user. For example, the system may determine a first identifier for the second user based on user information for the second user in response to the first user request. For example, the system determines a first identifier for the second user by analyzing and cross-referencing the user information provided in the first user's request with existing records or databases. When the first user submits a request to identify the second user, the system extracts key details, such as the second user's name, account number, email address, phone number, or other identifying information included in the request. It then searches its stored data for a match, using algorithms designed to handle variations in data formats, potential errors, or incomplete information. Once the system locates a match, it retrieves the associated identifier for the second user. This identifier, which could be a unique account number, username, token, or another distinct reference, serves as a secure and standardized way to recognize the second user within the system. By generating or confirming this first identifier, the system enables downstream processes, such as initiating authentication, verifying identity, or facilitating the requested network action. This approach ensures accurate identification while maintaining the security and integrity of the user data involved.

In some embodiments, the system may determine the first identifier for the second user based on the user information for the second user by receiving the user information in the first user request and extracting the user information from the first user request. For example, the system determines the first identifier for the second user by analyzing the user information provided in the first user request and extracting the relevant details to uniquely identify the second user. When the first user submits a request through the system, the request typically includes user information about the second user, such as their name, account number, email address, phone number, or other identifying attributes. The system receives this request and parses its contents to isolate the specific pieces of information that pertain to the second user. Using this extracted data, the system searches its database or identity management system to locate a matching record. This process may involve applying algorithms to handle variations in the provided data, such as differences in formatting, typos, or incomplete entries. Once a match is identified, the system retrieves the associated identifier for the second user. This first identifier, which could be a unique account number, username, or token, serves as a secure and standardized reference that the system can use to proceed with authentication, communication, or verification processes. By systematically extracting and matching user information, the system ensures accurate identification and maintains the integrity of subsequent interactions.

In some embodiments, the system may determine the first identifier for the second user based on the user information for the second user by accessing a user profile for the second user and extracting the user information from the user profile. For example, the system determines the first identifier for the second user by accessing the user profile associated with the second user and extracting the necessary information from it. When the system receives a request from the first user that includes basic details about the second user—such as a name, email address, or account number—it uses this information to locate the corresponding user profile in its database. The system searches the database using indexing, matching algorithms, or other retrieval methods to identify the specific profile associated with the provided information. Once the correct user profile is accessed, the system extracts the first identifier for the second user. This identifier is a unique reference, such as a user ID, account token, or encrypted key, which the system uses to securely identify and authenticate the second user throughout the process. The identifier is then used to facilitate secure communication, verification, or authentication related to the requested action. By leveraging detailed and well-maintained user profiles, the system ensures that the first identifier is accurate and reliable, reducing the risk of errors and enhancing the security of the process.

At step 506, process 500 (e.g., using one or more components described above) determines a secured token. For example, the system may determine a first secured token, wherein the first secured token comprises a first secured token type of a plurality of secured token types. For example, the system determines a first secured token by selecting or generating the token based on the context and requirements of the authentication process, including the type of secured token needed. When a secured token is required, the system evaluates the parameters of the request, such as the security level, the user's preferences, the nature of the network action, and the system's security policies. From a plurality of secured token types, which may include alphanumeric passcodes, one-time passwords (OTPs), biometric data (e.g., fingerprints or facial recognition), cryptographic keys, or voice-generated passphrases, the system identifies the most appropriate type for the situation. The selection process involves analyzing factors such as the sensitivity of the action, the device capabilities of the users involved, and compliance with regulatory or organizational security standards. Once the secured token type is determined, the system either generates a new token or retrieves an existing one linked to the user or transaction. For instance, if a high-security transaction is being processed, the system might generate a time-sensitive OTP or require biometric verification. This token is then securely transmitted to the appropriate party, ensuring that only authorized users can complete the authentication process. By dynamically determining the secured token type, the system maintains a balance between security, usability, and adaptability to diverse scenarios.

In some embodiments, the first secured token is a passphrase required to be spoken by the second user, wherein the first secured token requirement comprises a required number of pitch variations to secure the passphrase, and wherein comparing the first secured token to the first secured token requirement further comprises determining a number of pitch variations in the passphrase and comparing the number of pitch variations to the required number of pitch variations. For example, when the first secured token is a passphrase required to be spoken by the second user, the system validates the token by comparing it to specific requirements, such as a required number of pitch variations. The first secured token requirement specifies that the spoken passphrase must exhibit a certain degree of natural vocal variability to ensure it is genuine and not artificially generated or synthesized. For example, the system may process the audio using speech analysis algorithms. These algorithms extract acoustic features from the audio waveform, including pitch variations, tone shifts, and frequency modulations. The system calculates the number of distinct pitch variations within the passphrase, analyzing how the user's voice naturally fluctuates across syllables and words. The determined number of pitch variations is then compared to the required number specified in the first secured token requirement. If the passphrase meets or exceeds the required number of pitch variations, it is considered valid, and the system allows the token to be used for the authentication or network action. If the passphrase falls short of the requirement, the system may reject the token. By incorporating pitch variability into the validation process, the system adds an additional layer of security, making it harder for fraudulent or AI-generated audio to pass as legitimate.

In some embodiments, the first secured token is a passphrase required to be spoken by the second user, wherein the first secured token requirement comprises a required timbre characteristic to secure the passphrase, and wherein comparing the first secured token to the first secured token requirement further comprises determining a timbre characteristic for the passphrase and comparing the timbre characteristic to the required timbre characteristic. For example, when the first secured token is a passphrase required to be spoken by the second user, the system ensures its validity by comparing it to specific requirements, including a required timbre characteristic. Timbre refers to the unique quality or color of a person's voice, which is influenced by physical and acoustic properties such as vocal tract shape, harmonic content, and resonance. Incorporating timbre characteristics into the secured token requirement adds an additional layer of security by leveraging features that are difficult to replicate or synthesize. The system extracts the timbre characteristic of the potential passphrase by analyzing parameters such as spectral envelope, harmonic ratios, and formant frequencies. These attributes capture the unique vocal signature of the user. The system then compares the extracted timbre characteristic to the predefined requirement for the passphrase. This requirement could be based on a previously recorded sample of the user's voice or a generalized standard designed to differentiate natural human speech from artificial or manipulated audio. If the timbre of the spoken passphrase matches the required characteristic, the system validates the token for use. If the timbre deviates from the expected range, the system may reject the token. This process ensures a high level of security by leveraging the inherent uniqueness of vocal timbre as a biometric feature.

In some embodiments, the first secured token may be a passphrase required to be spoken by the second user, wherein the first secured token requirement comprises a required phonetic characteristic to secure the passphrase, and wherein comparing the first secured token to the first secured token requirement further comprises determining a phonetic characteristic for the passphrase and comparing the phonetic characteristic to the required phonetic characteristic. When the first secured token is a passphrase spoken by the second user, the system validates it by comparing it to predefined requirements, including a required phonetic characteristic. Phonetic characteristics refer to the specific sounds, pronunciation patterns, and articulatory features of the spoken passphrase. These characteristics are unique to the user's speech patterns and ensure that the passphrase is authentic and natural. Using speech recognition and phonetic analysis algorithms, the system breaks down the passphrase into its individual phonemes (distinct units of sound) and examines their properties, such as duration, articulation, and intonation. It also assesses the overall sequence of phonemes to confirm that they match the expected linguistic structure of the passphrase. The system then compares the extracted phonetic characteristic to the required characteristic specified in the first secured token requirement. This requirement may be based on a reference sample from a predefined phonetic model associated with the passphrase. If the phonetic characteristic aligns with the requirement—indicating correct pronunciation, natural speech flow, and adherence to expected patterns—the token is validated and may be used. Otherwise, the system may reject the token. By incorporating phonetic analysis, the system ensures a robust and reliable authentication process that leverages the intricacies of human speech.

In some embodiments, the first secured token may be a passphrase required to be spoken by the second user, wherein the first secured token requirement comprises a required acoustic characteristic to secure the passphrase, and wherein comparing the first secured token to the first secured token requirement further comprises determining an acoustic characteristic for the passphrase and comparing the acoustic characteristic to the required acoustic characteristic. For example, when the first secured token is a passphrase spoken by the second user, the system ensures its validity by comparing it to specific requirements, including a required acoustic characteristic. Acoustic characteristics refer to measurable properties of the sound, such as amplitude, frequency spectrum, energy distribution, and temporal dynamics. These characteristics help authenticate the passphrase by verifying that it was produced by a natural human voice and matches the expected acoustic profile. The system captures and processes the audio data using signal processing techniques. It analyzes the passphrase to extract acoustic features, such as the energy levels in different frequency bands, formant frequencies (resonances of the vocal tract), pitch contour, and temporal variations. These features are quantified to create a detailed acoustic profile of the spoken passphrase. The system then compares the extracted acoustic characteristic to the required acoustic characteristic specified in the first secured token requirement. This comparison involves checking whether the amplitude, frequency patterns, and other acoustic properties align with the expected values, which may be derived from a reference sample or a pre-established standard for the passphrase. If the acoustic characteristic matches the requirement, the token is validated for use. Otherwise, the system may reject the token. By leveraging acoustic analysis, the system ensures a secure and robust authentication process tailored to the nuances of human speech.

In some embodiments, the first secured token is a passphrase required to be spoken by the second user, wherein the first secured token requirement comprises a required audio waveform pattern to secure the passphrase, and wherein comparing the first secured token to the first secured token requirement further comprises determining an audio waveform pattern for the passphrase and comparing the audio waveform pattern to the required audio waveform pattern. For example, when the first secured token is a passphrase required to be spoken by the second user, the system validates it by comparing it to predefined requirements, including a required audio waveform pattern. The audio waveform pattern refers to the visual representation of the sound wave generated by the spoken passphrase, which captures the unique temporal and frequency characteristics of the audio. This pattern is distinctive to an individual's voice and can be used to verify the authenticity of the passphrase. The system captures the audio and processes it to generate its corresponding waveform. Using signal processing techniques, the system analyzes key features of the waveform, such as amplitude peaks, frequency modulations, temporal spacing between sounds, and overall waveform shape. These features are then extracted and quantified to form a detailed representation of the audio waveform pattern. The system compares the extracted waveform pattern to the required waveform pattern specified in the first secured token requirement. This requirement may be based on a reference waveform previously recorded from the second user or a generalized model representing acceptable patterns for the passphrase. The comparison involves assessing alignment across multiple dimensions, such as amplitude consistency, frequency distributions, and temporal synchronization. If the extracted waveform pattern matches the required pattern within an acceptable threshold, the system validates the token for use. If not, the system may reject the token. By incorporating audio waveform analysis, the system ensures a highly secure and precise authentication process.

In some embodiments, the first secured token is a passphrase required to be spoken by the second user, wherein the first secured token requirement comprises a required audio waveform pattern to secure the passphrase, and wherein comparing the first secured token to the first secured token requirement further comprises determining an audio waveform pattern for the passphrase and comparing the audio waveform pattern to the required audio waveform pattern. For example, When the first secured token is a passphrase required to be spoken by the second user, the system validates it by ensuring it matches a predefined audio waveform pattern, which serves as a key component of the first secured token requirement. The audio waveform pattern is a graphical representation of the sound wave produced by the spoken passphrase, capturing unique features such as frequency, amplitude, and temporal variations that are characteristic of the user's voice. Upon receiving the spoken passphrase, the system records the audio and processes it using advanced signal processing techniques to extract its waveform pattern. This involves analyzing the sound wave's amplitude peaks, frequency oscillations, temporal dynamics, and other waveform attributes that distinguish the spoken passphrase. The resulting waveform pattern provides a precise, measurable representation of the audio characteristics of the passphrase. The system then compares the extracted waveform pattern to the required audio waveform pattern, which is predefined and associated with the passphrase. This requirement could be based on a reference pattern created from a prior recording by the second user or a generalized pattern established for the passphrase's expected pronunciation and acoustics. The comparison involves checking for alignment across multiple dimensions, such as amplitude consistency, frequency distributions, and temporal synchronization. If the extracted waveform pattern aligns with the required pattern within an acceptable margin, the system validates the token. Otherwise, the system may reject the token. This approach ensures a secure and reliable authentication mechanism, leveraging the inherent uniqueness of audio waveform patterns to protect against unauthorized access or manipulation.

In some embodiments, the first secured token is a passphrase required to be spoken by the second user, wherein the first secured token requirement comprises a required passphrase length or keyword to secure the passphrase, and wherein comparing the first secured token to the first secured token requirement further comprises determining a passphrase length or keyword for the passphrase and comparing the passphrase length or keyword to the required passphrase length or keyword. For example, when the first secured token is a passphrase spoken by the second user, the system validates it by ensuring it meets predefined requirements, including a required passphrase length or the inclusion of specific keywords. These requirements help ensure that the passphrase is both secure and aligned with the authentication process's expectations. Upon receiving the spoken passphrase, the system processes the audio to convert the speech into a text representation using speech recognition technology. This transcription allows the system to analyze the passphrase's content, including its length and the presence of any required keywords. For length validation, the system counts the number of words, characters, or syllables in the transcribed passphrase and compares it to the minimum or maximum length specified in the requirement. For keyword validation, the system searches the transcription for specific words or phrases that must be present to satisfy the requirement. If the passphrase length or keyword matches the required criteria, the system validates the token. However, if the length falls outside the acceptable range or the required keywords are missing, the system may reject the token, prompt the first user to resubmit the passphrase, or flag the interaction for further review. This structured approach ensures that the passphrase adheres to security protocols while allowing flexibility in tailoring requirements to specific use cases or security levels.

In some embodiments, the system may determine the first secured token by receiving a requested network action in the first user request and selecting the first secured token type from the plurality of secured token types based on the requested network action. For example, the system determines the first secured token by analyzing the requested network action provided in the first user request and selecting the most appropriate secured token type from a plurality of secured token types. When the first user submits a request to initiate a network action, such as approving a financial transaction, accessing sensitive data, or modifying account settings, the system evaluates the nature of the action to determine its security requirements. Factors such as the action's sensitivity, risk level, regulatory compliance needs, and the capabilities of the involved users and devices are taken into account. Based on this evaluation, the system selects a secured token type that aligns with the action's security needs. For example, if the network action involves a high-value financial transaction, the system may choose a biometric secured token type, such as a voice passphrase or fingerprint scan, to ensure a high level of authenticity. Conversely, for a routine data access request, the system might opt for a simpler secured token type, such as a one-time password (OTP) sent via email or SMS. Once the secured token type is selected, the system generates or retrieves the first secured token according to the specifications of the chosen type. It then associates the secured token with the network action and incorporates it into the authentication process. By dynamically selecting the secured token type based on the requested network action, the system ensures that the level of security is proportional to the action's risk, enhancing both efficiency and protection against unauthorized access.

At step 508, process 500 (e.g., using one or more components described above) determines a secured token requirement. For example, the system may determine a first secured token requirement for the first secured token based on the first secured token type, wherein the first secured token requirement comprises a playback characteristic of the first secured token. The system determines a first secured token requirement for a secured token by analyzing the specific characteristics and attributes associated with the chosen secured token type. For instance, when the first secured token type involves a voice-based passphrase, the system defines the requirements needed for proper validation, which might include playback characteristics. These playback characteristics could encompass parameters such as audio quality, duration, pitch range, phonetic consistency, and the presence of specific acoustic patterns. To establish these requirements, the system evaluates the context in which the secured token will be used, including the security level required, the environment in which it will be captured (e.g., noisy or controlled), and any user-specific attributes like their typical speech patterns. The playback characteristics ensure that the token can be reliably recorded, stored, and validated during authentication. For example, the system might require that the recorded passphrase have a minimum signal-to-noise ratio, fall within a defined pitch range, and exhibit a recognizable waveform pattern. These requirements are used to configure both the token submission process (e.g., ensuring the token is recorded under optimal conditions) and the validation mechanism (e.g., verifying that the playback matches the expected characteristics). By defining precise requirements tailored to the secured token type, the system ensures robust security and reduces the risk of misidentification or fraud.

At step 510, process 500 (e.g., using one or more components described above) compares the first secured token to the first secured token requirement. For example, the system may compare the first secured token to the first secured token requirement. The system compares the first secured token to the first secured token requirement by analyzing the submitted token against predefined parameters that define its validity. When the first secured token is received, the system extracts key attributes or features, such as its format, content, and other characteristics specific to the secured token type. For example, if the token is a voice-based passphrase, the system analyzes its playback characteristics, including audio quality, phonetic structure, pitch range, duration, and waveform patterns. The system then matches these extracted features against the first secured token requirement, which specifies the expected attributes for the token to be considered valid. This process might involve applying algorithms or machine learning models trained to detect deviations, anomalies, or inconsistencies. For instance, the system might check whether the pitch and phonetic patterns align with the user's typical speech profile or whether the audio signal meets a required signal-to-noise ratio. If the token satisfies all the specified requirements, the system deems it valid and proceeds to user the token for approving the associated network action.

At step 512, process 500 (e.g., using one or more components described above) generates a communication package. For example, the system may, in response to comparing the first secured token to the first secured token requirement, generate a first communication package for transmitting to the second user based on the first identifier and the first secured token. For example, in response to comparing the first secured token to the first secured token requirement, a system generates a first communication package to transmit to the second user by assembling the necessary information in a secure and structured format. Once the system has validated the first secured token and confirmed its alignment with the predefined requirements, it uses the first identifier associated with the second user to direct the communication package to the appropriate recipient. The communication package typically includes details such as the verified secured token, relevant metadata (e.g., timestamp, token type, or validation status), and the first identifier of the second user. Depending on the context, the package may also include instructions for the second user, such as confirming their approval of a network action or providing additional authentication if needed. To ensure security, the system encrypts the communication package using cryptographic protocols, protecting the sensitive information during transmission. The system then transmits the package through a secure communication channel, such as an encrypted API call, a secure messaging platform, or an email with end-to-end encryption. By carefully assembling and securely transmitting the communication package, the system ensures that the second user receives accurate and actionable information, facilitating the completion of the authentication or verification process.

In some embodiments, the first communication package identifies the second user by generating a prompt requesting the second user regenerate the first secured token, causing the second user to submit a second secured token in response to the prompt, and generating a second communication package for transmission to the first user comprising the second secured token. For example, the first communication package identifies the second user by including a prompt that requests the second user to regenerate the first secured token. This prompt may be designed to be clear and actionable, requesting the second user to provide a new secured token. For instance, it might include instructions such as "Please re-submit the verbal passphrase" or "Generate and submit the following one-time password." Upon receiving the prompt through a secure user interface, the second user regenerates the secured token, such as by re-recording the passphrase, generating a new OTP, or completing another authentication step. The regenerated token is then submitted back to the system via their designated interface.

The system validates the second secured token by comparing it to the first token and confirming its alignment with the expected parameters. To do so, the system may create a second communication package for transmission to the first user. This package includes the second secured token along with metadata that verifies its validity, such as a timestamp, user identifier, and confirmation of successful authentication. The second communication package is securely transmitted to the first user, ensuring that they can proceed with their verification or network action with confidence in the authenticity of the second user's identity. This iterative process ensures a robust, secure, and user-centric approach to handling authentication and verification.

In some embodiments, the system may transmit the second communication package to the first user. The first user may receive the second communication package, listen to the second secured token, and/or determine whether to validate the transaction. For example, the first user receives the second communication package through their designated user interface, which securely displays or plays back the contents of the package. This package includes the second secured token and any accompanying metadata, such as a timestamp, the second user's identifier, and the status of the token validation process. If the second secured token is a voice-based passphrase, the system enables the first user to listen to the audio playback directly through the interface. As the first user listens to the second secured token, they evaluate whether it matches the expected characteristics of the token, such as the content of the passphrase, its tone, and other defining features. The system may also provide visual or textual cues to help the first user make an informed decision, such as highlighting whether the token met predefined requirements during system validation. Based on their review, the first user determines whether to validate the transaction associated with the second secured token. If the token aligns with the expected parameters and no anomalies are detected, the first user can approve the transaction through the interface. Conversely, if the token appears invalid or suspicious, the first user may reject the transaction, request additional verification, or flag the interaction for further investigation. This process empowers the first user to make a secure and informed decision while leveraging the system's validation mechanisms for enhanced confidence.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for user-to-user authentication for secured communications.

2. The method of any one of the preceding embodiments, further comprising: receiving, from a first user, a first user request to identify a second user, wherein the first user request indicates a first network action requiring an identify confirmation of the second user; in response to the first user request: determining a first identifier for the second user based on user information for the second user; determining a first secured token, wherein the first secured token comprises a first secured token type of a plurality of secured token types; determining a first secured token requirement for the first secured token based on the first secured token type, wherein the first secured token requirement comprises a playback characteristic of the first secured token; and comparing the first secured token to the first secured token requirement; and in response to comparing the first secured token to the first secured token requirement, generating a first communication package for transmitting to the second user based on the first identifier and the first secured token.

3. The method of any one of the preceding embodiments, wherein the first communication package identifies the second user by: generating a prompt requesting the second user regenerate the first secured token; causing the second user to submit a second secured token in response to the prompt; and generating a second communication package for transmission to the first user comprising the second secured token.

4. The method of any one of the preceding embodiments, wherein the first communication package identifies the second user by: generating a prompt requesting the second user regenerate the first secured token; causing the second user to submit a second secured token in response to the prompt; and comparing the first secured token to the second secured token.

5. The method of any one of the preceding embodiments, wherein determining the first identifier for the second user based on the user information for the second user further comprises: receiving the user information in the first user request; and extracting the user information from the first user request.

6. The method of any one of the preceding embodiments, wherein determining the first identifier for the second user based on the user information for the second user further comprises: accessing a user profile for the second user; and extracting the user information from the user profile.

7. The method of any one of the preceding embodiments, wherein the first secured token is a passphrase required to be spoken by the second user, wherein the first secured token requirement comprises a required number of pitch variations to secure the passphrase, and wherein comparing the first secured token to the first secured token requirement further comprises: determining a number of pitch variations in the passphrase; and comparing the number of pitch variations to the required number of pitch variations.

8. The method of any one of the preceding embodiments, wherein the first secured token is a passphrase required to be spoken by the second user, wherein the first secured token requirement comprises a required timbre characteristic to secure the passphrase, and wherein comparing the first secured token to the first secured token requirement further comprises: determining a timbre characteristic for the passphrase; and comparing the timbre characteristic to the required timbre characteristic.

9. The method of any one of the preceding embodiments, wherein the first secured token is a passphrase required to be spoken by the second user, wherein the first secured token requirement comprises a required phonetic characteristic to secure the passphrase, and wherein comparing the first secured token to the first secured token requirement further comprises: determining a phonetic characteristic for the passphrase; and comparing the phonetic characteristic to the required phonetic characteristic.

10. The method of any one of the preceding embodiments, wherein the first secured token is a passphrase required to be spoken by the second user, wherein the first secured token requirement comprises a required acoustic characteristic to secure the passphrase, and wherein comparing the first secured token to the first secured token requirement further comprises: determining an acoustic characteristic for the passphrase; and comparing the acoustic characteristic to the required acoustic characteristic.

11. The method of any one of the preceding embodiments, wherein the first secured token is a passphrase required to be spoken by the second user, wherein the first secured token requirement comprises a required audio waveform pattern to secure the passphrase, and wherein comparing the first secured token to the first secured token requirement further comprises: determining an audio waveform pattern for the passphrase; and comparing the audio waveform pattern to the required audio waveform pattern.

12. The method of any one of the preceding embodiments, wherein the first secured token is a passphrase required to be spoken by the second user, wherein the first secured token requirement comprises a required passphrase length to secure the passphrase, and wherein comparing the first secured token to the first secured token requirement further comprises: determining a passphrase length for the passphrase; and comparing the passphrase length to the required passphrase length.

13. The method of any one of the preceding embodiments, wherein the first secured token is a passphrase required to be spoken by the second user, wherein the first secured token requirement comprises a required keyword to secure the passphrase, and wherein comparing the first secured token to the first secured token requirement further comprises: determining a keyword for the passphrase; and comparing the keyword to the required keyword.

14. The method of any one of the preceding embodiments, wherein determining the first secured token further comprises: receiving a requested network action in the first user request; and selecting the first secured token type from the plurality of secured token types based on the requested network action.

15. One or more non-transitory, computer-readable mediums storing instructions that, when executed by a data processing apparatus, cause the data processing apparatus to perform operations comprising those of any of embodiments 1-14.

16. A system comprising one or more processors; and memory storing instructions that, when executed by the processors, cause the processors to effectuate operations comprising those of any of embodiments 1-14.

17. A system comprising means for performing any of embodiments 1-14.

What is claimed is:

1. A system for user-to-user authentication for cryptographically secured communications across encrypted computer networks, the system comprising:
   one or more processors; and
   one or more non-transitory, computer-readable media, comprising instructions that, when executed by the one or more processors, cause operations comprising:
      generating a first cryptographically secured session between a first user and a second user;
      during the first cryptographically secured session, receiving, from the first user, a first user request to identify the second user, wherein the first user request indicates a first network action requiring an identify confirmation of the second user;
      in response to the first user request:
         determining a first identifier for the second user based on user information for the second user;
         determining a first secured token, wherein the first secured token comprises a first secured token type of a plurality of secured token types;
         determining a first secured token requirement for the first secured token based on the first secured token type; and
         comparing the first secured token to the first secured token requirement; and
      in response to comparing the first secured token to the first secured token requirement, generating a first encrypted communication package for transmitting to the second user based on the first identifier and the first secured token, wherein the first encrypted communication package identifies the second user by:
      generating a prompt requesting the second user regenerate the first secured token;
      causing the second user to submit a second secured token comprising a required playback characteristic in response to the prompt; and
      generating a second encrypted communication package for transmission, via the first cryptographically secured session, to the first user comprising the second secured token.

2. A method for user-to-user authentication for secured communications, the method comprising:
   receiving, from a first user, a first user request to identify a second user, wherein the first user request indicates a first network action requiring an identify confirmation of the second user;

in response to the first user request:

determining a first identifier for the second user based on user information for the second user;

determining a first secured token, wherein the first secured token comprises a first secured token type of a plurality of secured token types;

determining a first secured token requirement for the first secured token based on the first secured token type, wherein the first secured token requirement comprises a playback characteristic of the first secured token; and comparing the first secured token to the first secured token requirement; and in response to comparing the first secured token to the first secured token requirement, generating a first communication package for transmitting to the second user based on the first identifier and the first secured token, wherein the first communication package identifies the second user by:

generating a prompt requesting the second user regenerate the first secured token;

causing the second user to submit a second secured token comprising a required playback characteristic in response to the prompt; and generating a second communication package for transmission to the first user comprising the second secured token.

3. The method of claim 2, wherein the first communication package identifies the second user by:

comparing the first secured token to the second secured token.

4. The method of claim 2, wherein determining the first identifier for the second user based on the user information for the second user further comprises:

receiving the user information in the first user request; and extracting the user information from the first user request.

5. The method of claim 2, wherein determining the first identifier for the second user based on the user information for the second user further comprises:

accessing a user profile for the second user; and extracting the user information from the user profile.

6. The method of claim 2, wherein the first secured token is a passphrase required to be spoken by the second user, wherein the first secured token requirement comprises a required number of pitch variations to secure the passphrase, and wherein comparing the first secured token to the first secured token requirement further comprises:

determining a number of pitch variations in the passphrase; and comparing the number of pitch variations to the required number of pitch variations.

7. The method of claim 2, wherein the first secured token is a passphrase required to be spoken by the second user, wherein the first secured token requirement comprises a required timbre characteristic to secure the passphrase, and wherein comparing the first secured token to the first secured token requirement further comprises:

determining a timbre characteristic for the passphrase; and comparing the timbre characteristic to the required timbre characteristic.

8. The method of claim 2, wherein the first secured token is a passphrase required to be spoken by the second user, wherein the first secured token requirement comprises a required phonetic characteristic to secure the passphrase, and wherein comparing the first secured token to the first secured token requirement further comprises:

determining a phonetic characteristic for the passphrase; and comparing the phonetic characteristic to the required phonetic characteristic.

9. The method of claim 2, wherein the first secured token is a passphrase required to be spoken by the second user, wherein the first secured token requirement comprises a required acoustic characteristic to secure the passphrase, and wherein comparing the first secured token to the first secured token requirement further comprises:

determining an acoustic characteristic for the passphrase; and comparing the acoustic characteristic to the required acoustic characteristic.

10. The method of claim 2, wherein the first secured token is a passphrase required to be spoken by the second user, wherein the first secured token requirement comprises a required audio waveform pattern to secure the passphrase, and wherein comparing the first secured token to the first secured token requirement further comprises:

determining an audio waveform pattern for the passphrase; and comparing the audio waveform pattern to the required audio waveform pattern.

11. The method of claim 2, wherein the first secured token is a passphrase required to be spoken by the second user, wherein the first secured token requirement comprises a required passphrase length to secure the passphrase, and wherein comparing the first secured token to the first secured token requirement further comprises:

determining a passphrase length for the passphrase; and comparing the passphrase length to the required passphrase length.

12. The method of claim 2, wherein the first secured token is a passphrase required to be spoken by the second user, wherein the first secured token requirement comprises a required keyword to secure the passphrase, and wherein comparing the first secured token to the first secured token requirement further comprises:

determining a keyword for the passphrase; and comparing the keyword to the required keyword.

13. The method of claim 2, wherein determining the first secured token further comprises:

receiving a requested network action in the first user request; and selecting the first secured token type from the plurality of secured token types based on the requested network action.

14. One or more non-transitory, computer-readable media, comprising instructions that, when executed by one or more processors, cause operations comprising:

generating a first secured session between a first user and a second user;

during the first secured session, receiving, from the first user, a first communication package for identifying the second user, wherein the first communication package comprises a prompt requesting the second user regenerate a first secured token, wherein the first secured token is a first secured token type of a plurality of secured token types, and wherein the first secured token meets a first secured token requirement for the first secured token type, wherein the first secured token is a passphrase required to be spoken by the second user, wherein the first secured token requirement comprises a required number of pitch variations to secure the passphrase, and wherein meeting the first secured token requirement comprises:

determining a number of pitch variations in the passphrase; and comparing the number of pitch variations to the required number of pitch variations;

receiving a user submission of a second secured token in response to the prompt;

generating a second communication package based on the user submission; and transmitting the second communication package to the first user.

15. The one or more non-transitory, computer-readable media of claim 14, wherein the first secured token is a passphrase required to be spoken by the second user, wherein the first secured token requirement comprises a required timbre characteristic to secure the passphrase, and wherein meeting the first secured token requirement comprises:

determining a timbre characteristic for the passphrase; and comparing the timbre characteristic to the required timbre characteristic.

16. The one or more non-transitory, computer-readable media of claim 14, wherein the first secured token is a passphrase required to be spoken by the second user, wherein the first secured token requirement comprises a required phonetic characteristic to secure the passphrase, and wherein meeting the first secured token requirement comprises:

determining a phonetic characteristic for the passphrase; and comparing the phonetic characteristic to the required phonetic characteristic.

17. The one or more non-transitory, computer-readable media of claim 14, wherein the first secured token is a passphrase required to be spoken by the second user, wherein the first secured token requirement comprises a required acoustic characteristic to secure the passphrase, and wherein comparing the first secured token to the first secured token requirement further comprises:

determining an acoustic characteristic for the passphrase; and comparing the acoustic characteristic to the required acoustic characteristic.

18. The one or more non-transitory, computer-readable media of claim 14, wherein the first secured token is a passphrase required to be spoken by the second user, wherein the first secured token requirement comprises a required audio waveform pattern to secure the passphrase, and wherein comparing the first secured token to the first secured token requirement further comprises:

determining an audio waveform pattern for the passphrase; and comparing the audio waveform pattern to the required audio waveform pattern.

* * * * *